United States Patent
Obayashi et al.

(10) Patent No.: US 10,075,620 B2
(45) Date of Patent: Sep. 11, 2018

(54) INFORMATION PROCESSING APPARATUS, CONTROL METHOD FOR INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Masaaki Obayashi, Kawasaki (JP); Naoki Sumi, Kawasaki (JP); Kiyoshi Umeda, Kawasaki (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/741,973

(22) Filed: Jun. 17, 2015

(65) Prior Publication Data

US 2015/0379741 A1    Dec. 31, 2015

(30) Foreign Application Priority Data

Jun. 30, 2014 (JP) ................ 2014-135176

(51) Int. Cl.
*G06T 11/00* (2006.01)
*H04N 1/60* (2006.01)

(52) U.S. Cl.
CPC .......... *H04N 1/603* (2013.01); *H04N 1/6058* (2013.01)

(58) Field of Classification Search
CPC .................... H04N 1/6058; H04N 1/603
See application file for complete search history.

(56) References Cited

U.S. PATENT DOCUMENTS

| | | | |
|---|---|---|---|
| 8,873,090 B2 | 10/2014 | Nakagawa | |
| 2008/0278736 A1* | 11/2008 | Kawashima | G06F 3/1211 358/1.9 |
| 2012/0026548 A1 | 2/2012 | Nakagawa | |
| 2014/0049790 A1* | 2/2014 | Nakamura | G06F 3/1298 358/1.13 |
| 2015/0009537 A1 | 1/2015 | Nakagawa | |
| 2015/0379382 A1* | 12/2015 | Mizoguchi | G06F 3/12 358/1.15 |

FOREIGN PATENT DOCUMENTS

| | | |
|---|---|---|
| JP | 2008160434 A | 7/2008 |
| JP | 2008283546 A | 11/2008 |

(Continued)

OTHER PUBLICATIONS

U.S. Appl. No. 14/727,182, filed Jun. 1, 2015, Applicants: Tomohiro Suzuki, et al.

(Continued)

*Primary Examiner* — Samantha (Yuehan) Wang
(74) *Attorney, Agent, or Firm* — Fitzpatrick, Cella, Harper & Scinto

(57) ABSTRACT

In a program including the first program layer with an instruction set to be interpreted and performed by a processor and the second program layer with an instruction set translated in advance by a unit other than the processor, image data to be processed, which is designated in the first program layer, is converted into image data in a format usable in the second program layer. Image processing including color conversion is performed for the converted image data.

28 Claims, 14 Drawing Sheets

(56) References Cited

FOREIGN PATENT DOCUMENTS

| JP | 2011188434 A | 9/2011 |
|---|---|---|
| JP | 2011-233034 A | 11/2011 |
| WO | 2014097587 A1 | 6/2014 |

OTHER PUBLICATIONS

U.S. Appl. No. 14/728,265, filed Jun. 2, 2015, Applicants: Kiyoshi Umeda, et al.
U.S. Appl. No. 14/743,487, filed Jun. 18, 2015, Applicants: Kiyoshi Umeda, et al.
U.S. Appl. No. 14/743,459, filed Jun. 18, 2015, Applicants: Naoki Sumi, et al.
U.S. Appl. No. 14/722,452, filed May 27, 2015, Applicants: Maya Kurokawa, et al.
U.S. Appl. No. 14/740,678, filed Jun. 16, 2015, Applicants: Fumitaka Goto, et al.
U.S. Appl. No. 14/740,752, filed Jun. 16, 2015, Applicants: Hiroyasu Kunieda, et al.
U.S. Appl. No. 14/730,985, filed Jun. 4, 2015, Applicants: Masao Kato, et al; and.
U.S. Appl. No. 14/741,958, filed Jun. 17, 2015, Applicants: Yoshinori Mizoguchi, et al.
Watanabe, M. "Hybrid Structure of Native Application and Web Application for the Smartphones which improves Productivity and Functionality", UNISYS Technology Review, vol. 30 No. 1, Nihon University, Jun. 2010, pp. 53-62.
Japanese Office Action issued in corresponding Japanese Application No. 2014135176 dated Apr. 27, 2018.

\* cited by examiner

INFORMATION PROCESSING APPARATUS, CONTROL METHOD FOR INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing technique.

Description of the Related Art

A portable multi-function terminal (to be referred to as a mobile computer hereinafter) is basically formed from three elements, that is, hardware as the computer itself, an operating system (to be referred to as an OS hereinafter) operating on the hardware, and applications operating on the OS. By using the applications, the user can use functions such as a map, mail, or browsing of a Web site on the Internet.

As examples of the form of such applications operating on the mobile computer, there are mainly two application forms, that is, a native application and Web application. The features of each application form will be explained below.

The native application is developed by using a development environment and development language which correspond to each OS. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler interpretable by the CPU of the computer. Thus, the general native application has an advantage that it is possible to perform an operation at high speed since the CPU directly interprets instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

Japanese Patent Laid-Open No. 2011-233034 discloses a technique of performing printing by a Web application operating on a Web Browser.

As described above, an image such as a photo may be stored in a recent mobile computer. An application of performing filter processing of changing the image into a monochrome/sepia-toned image or image processing of correcting the brightness, color balance, and the like of the photo has become very important and essential to the user. When creating an application capable of readily providing such image processing to the user without any stress in each of the above two application forms, this may have the following advantages and disadvantages.

The native application has an advantage that it is possible to perform processing at high speed, as described above. However, it is necessary to develop the application using different development language for different OSes. This may increase the development cost and development time, thereby making it impossible to quickly provide the application to the user. Also, it is necessary to compile (translate) the native application in advance. Therefore, for example, it may be difficult to change the UI (User Interface) design of the application at the time of an operation, or dynamically add a function, resulting in a lack of flexibility.

As for the Web application, the main body of the Web application described in HTML5, CSS, or JavaScript generally may exist on a server outside the mobile computer. Since the Web application is dynamically downloaded from the server to the mobile computer via an Internet line when using it, it is possible to dynamically change the UI design or the like without compiling the application in advance.

However, when performing advanced complex processing, there are only two choices about whether to perform the Web application on the browser by JavaScript or on the server under the security restrictions of the browser. Conventionally, JavaScript is described as a script of character strings perceivable by a human, and can be performed by compiling the script, as needed, at the time of operating the script. Consequently, if complex processing is described by JavaScript, the operation may be slowed down.

On the other hand, if the complex processing is performed by the server, the time is required to upload data such as photos existing in the mobile computer to the server via the Internet line, and download the result of the processing by the server from the server. In some cases, this arrangement cannot implement immediate processing with little stress on the mobile application.

On the other hand, the color difference between different devices such as a camera, scanner, display, and printer conventionally becomes a problem. To solve this problem, there is provided a color management system (CMS) for collectively managing color. The mobile computer is equally required to support the CMS. However, the present/absence of support for the CMS and a color management module for performing color conversion may be different for each OS. There is a need to perform independent color management in order to take advantage of the feature of each application.

Processing associated with the CMS cannot be performed at high speed by the Web application, and is desirably performed by the native application. On the other hand, the data format of image data processed by the Web application is different from that of image data processed by the native application. If, therefore, image processing is requested for image data displayed by the Web application, even if the image data processed by the Web application is transmitted to the native application, the native application may be unable to perform the image processing. Even if the native application performs the image processing for the image data, the Web application may be unable to display the image data having been applied with the image processing.

SUMMARY OF THE INVENTION

The present invention has been made to solve the above problems, and provides an apparatus use environment with higher flexibility and convenience.

According to the first aspect of the present invention, there is provided an information processing apparatus for performing, by a processor, a program including a first program layer with an instruction set to be interpreted and performed by the processor and a second program layer with an instruction set translated in advance by a unit other than the processor, comprising: a conversion unit configured to convert image data to be processed, which is designated in the first program layer, into image data in a format usable in the second program layer; and an image processing unit configured to perform image processing including color conversion for the image data converted by the conversion unit, wherein the second program layer includes the image processing unit.

According to the second aspect of the present invention, there is provided a control method for an information processing apparatus for performing, by a processor, a program including a first program layer with an instruction set to be interpreted and performed by the processor and a second program layer with an instruction set translated in advance by a unit other than the processor, the method comprising: converting image data to be processed, which is designated in the first program layer, into image data in a format usable in the second program layer; and performing image processing including color conversion for the converted image data, wherein the image processing is performed in the second program layer.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

<First Embodiment>

In this embodiment, an arrangement in which a hybrid application (to be described later) is operated on an information processing apparatus, various kinds of image processing are applied to an image selected by the user, and then the image is printed will be explained.

<Description of Hardware Arrangement>

Figure 1:
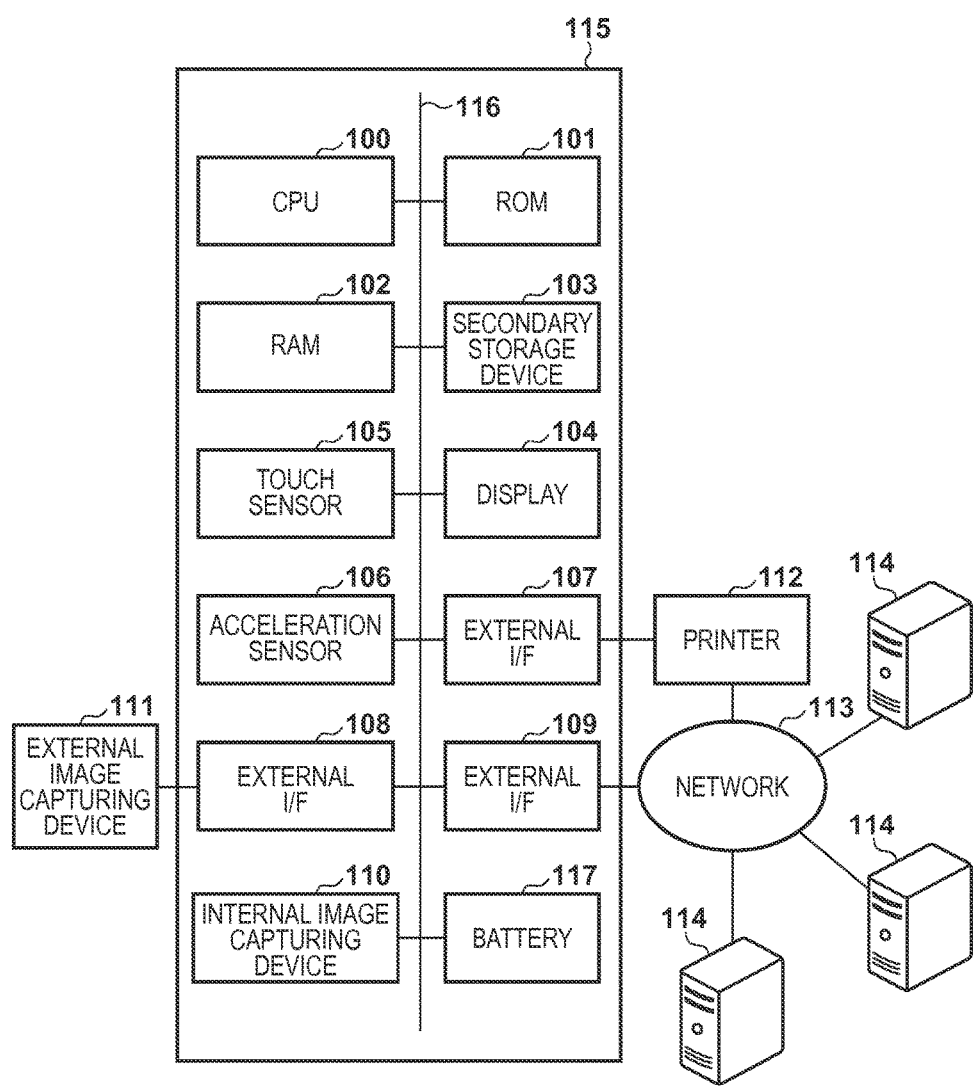
FIG. 1 is a block diagram showing the arrangement of an information processing apparatus.

FIG. 1 is a block diagram for explaining an example of the arrangement of a portable information terminal such as a smartphone or portable telephone as an information processing apparatus 115. Referring to FIG. 1, a CPU (Central Processing Unit/Processor) 100 performs various kinds of processing (to be described below) according to a program. There is one CPU 100 in FIG. 1 but a plurality of CPUs or CPU cores may be included. A ROM 101 stores a program to be performed by the CPU 100. A RAM 102 is a memory for temporarily storing various kinds of information at the time of performing the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of performed processing. The display 104 may include a touch sensor 105.

The information processing apparatus 115 may include an internal image capturing device 110. Image data captured by the internal image capturing device 110 undergoes predetermined image processing, and is then saved in the secondary storage device 103. Image data may be loaded from an external image capturing device 111 connected via an external I/F 108.

The information processing apparatus 115 includes an external I/F 109, and can perform communication via a network 113 such as the Internet. The information processing apparatus 115 can acquire, via the external I/F 109, image data from servers 114 connected to the network 113.

The information processing apparatus 115 includes an acceleration sensor 106, and can acquire acceleration information about the position and orientation of the information processing apparatus 115. The information processing apparatus 115 is connected to a printer 112 via an external I/F 107, and can output data such as image data. The printer 112 is also connected to the network 113, and can transmit/receive image data via the external I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth, infrared communication, or the like is used. If a wireless LAN is used for wireless communication, there are a mode in which apparatuses are directly connected to each other and a mode in which apparatuses are connected to each other via a relay apparatus such as a wireless LAN router. Although the external I/Fs 107 to 109 are arranged separately, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the performing location (software performing environment) of software such as a program performed by the control unit (CPU 100) of the information processing apparatus 115.

<Block Diagram of Software>

Figure 2:
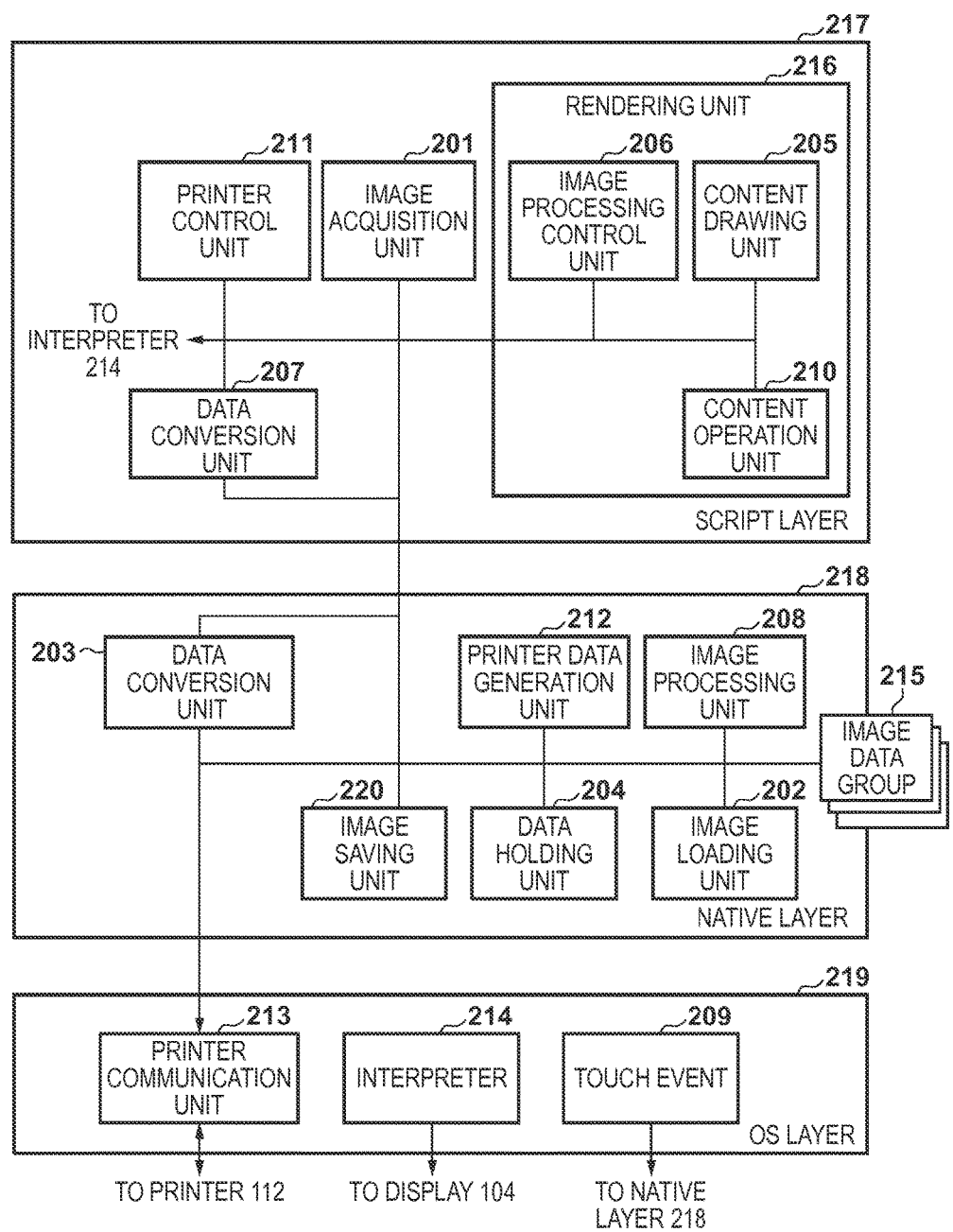
FIG. 2 is a block diagram showing the software arrangement of the information processing apparatus.

FIG. 2 is a block diagram showing the arrangement of software programs operating on the information processing apparatus 115.

The information processing apparatus 115 performs a program of a script layer 217, native layer 218, and OS layer 219. Each layer is implemented when the CPU 100 reads out and performs the corresponding program stored in the ROM 101 or secondary storage device 103.

The script layer 217 is a program layer in which an instruction set (drawing of a content, display of an image, playback of a moving image, and the like) is described by text data using a Web standard language such as HTML5, CSS3, or JavaScript. In this script layer 217, in an application performing environment, various instruction sets of text data are translated and performed using a processor (for example, the CPU 100) existing in the application performing environment. For example, there may be a form in which statements are dynamically translated line by line every performing operation, a form in which statements are translated when activating an application, and a form in which statements are translated when installing an application in the information processing apparatus 115.

Processing in the script layer 217 and its contents will be referred to as a script hereinafter. As an example of a form in which the instructions of the script are translated in the information processing apparatus 115, the interpreter function included in the native layer 218 or OS layer 219 is used. Note that in this embodiment, most of the UIs of the application are assumed to be described in the script layer 217.

The native layer 218 is a program layer in which an instruction set translated (compiled) in advance in an environment other than the application performing environment is described. In the native layer 218, a code described in a high-level language such as C or C++ is compiled in advance on the server or the PC of the developer of the application into an aggregate of instructions interpretable by the CPU 100. Processing in the native layer 218 and its contents, and calling of the function of the OS layer 219 (to be described later) from the native layer 218 will be referred to as "native" hereinafter. Note that an example of another implementation system of the native layer 218 is Java. Java is a high-level language similar to C/C++, and is translated in advance into an intermediate code in the development environment at the time of development of the application. The translated intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing calling of the native layer 218 from the script layer 217 will be referred to as "binding" or "bind". The native layer includes an API, and the various functions of the native layer can be used when the API calls the script. In general, this binding function is normally included in each of various OSs.

Note that in this embodiment, the application including the script layer 217 and native layer 218 will be referred to as a hybrid application.

An image acquisition unit 201 of the script layer 217 requests the native layer 218 to acquire image data. At the time of the acquisition request, the image acquisition unit 201 generates a unique ID, and transmits it to the native layer 218. This ID and the image data loaded by an image loading unit 202 of the native layer 218 are stored in a pair in a data holding unit 204 of the native layer 218. In addition, for example, a method of designating an absolute path, a method of prompting display of a dialog, or the like can be used.

The image loading unit 202 of the native layer 218 acquires the image data from an image data group 215. A method of acquiring the image data from the image data group 215 depends on the request of the image acquisition unit 201 of the script layer 217. The request method may be selected from a dialog box provided on the UI, or an image may be directly selected based on the path of a file.

A data conversion unit 203 of the native layer 218 converts data (for example, image data in the binary format) in the native layer 218 into data (for example, image data in the text format (base64)) in a format usable in the script layer 217. On the other hand, the data conversion unit 203 also converts data (for example, image data in the text format (base64)) sent from the script layer 217 into a format (for example, image data in the binary format) usable in the native layer 218.

A data conversion unit 207 of the script layer 217 converts data (for example, a processing parameter in the text format) in the script layer 217 into data (for example, a processing parameter in the text format (JSON format)) in a format usable in the native layer 218. On the other hand, the data conversion unit 207 also converts data sent from the native layer 218 into a format usable in the script layer 217.

The data holding unit 204 of the native layer 218 holds the image data loaded by the image loading unit 202, image data having undergone image processing by an image processing unit 208, and color conversion data to be used by the image processing unit 208 for color conversion. The held image data is rasterized into, for example, an RGB image signal, and has a format in which it is possible to immediately perform image processing. The held image data is paired with the ID generated by the image acquisition unit 201 of the script layer 217. Thus, it is possible to acquire the corresponding image data from the data holding unit 204 by designating the ID.

A content drawing unit 205 of the script layer 217 displays, on the display 104, the image data acquired via the data conversion unit 203 of the native layer 218. The content drawing unit 205 re-draws image data operated by a content operation unit 210. The content operation unit 210 operates the image data in the script layer 217. Examples of this operation are enlargement, movement, and rotation of the image data. The content drawing unit 205 describes a content to be printed by using a Web standard language. The script operated by the content operation unit 210 is also reflected on the description. The script of the content described by the content drawing unit 205 is interpreted by an interpreter 214 of the OS layer 219, and displayed on the display 104.

An image processing control unit 206 decides a correction parameter to be used for image processing, and requests the image processing unit 208 of the native layer 218 to perform image processing. First, the image processing control unit 206 sets a correction parameter in the script layer 217. In the data conversion unit 207, the set correction parameter is converted into a format transmittable to the native layer 218. The converted correction parameter is then transmitted to the native layer 218 together with the ID of image data to be processed.

The image processing unit 208 of the script layer 217 acquires an image corresponding to the ID designated by the image processing control unit 206 from the data holding unit 204 of the native layer 218, and performs image processing. At this time, image processing to be performed is decided based on the correction parameter set by the image processing control unit 206.

A touch event 209 of the OS layer 219 acquires information about a touch of the display 104. The information about a touch includes, for example, touch detection of the display 104 and touched position information. The acquired information about a touch is transmitted to the content operation unit 210 of the script layer 217 via the native layer 218.

A printer control unit 211 of the script layer 217 controls a rendering start request to a rendering unit 216, a printer detection request, display of a printer setting screen, and generation and transmission of print information. In the printer setting screen, printer settings such as a paper size, paper type, and color/monochrome are made. A printer data generation unit 212 generates printer data based on the items set in the printer setting screen.

Based on the request from the printer control unit 211, the printer data generation unit 212 generates a command and data necessary for printer communication. The data necessary for printer communication is data complying with a communication protocol, and the command is data for deciding the operation of the printer such as printing or scanning.

A printer communication unit 213 of the OS layer 219 transmits the printer data received from the printer data generation unit 212 to the connected printer 112, and receives information about the printer 112 from the printer 112. The interpreter 214 of the OS layer 219 interprets/performs an instruction generated in the script layer 217. For example, an instruction of drawing an image or the like is performed via the interpreter 214 and displayed on the display 104.

The image data group 215 is an area which holds image data. A data saving unit 220 saves image data held in the data holding unit 204 in the image data group 215, as needed.

The rendering unit 216 controls the content drawing unit 205, image processing control unit 206, and content operation unit 210 to render the image data to be processed. This rendering operation includes, for example, generation of an image of an output resolution in the script layer 217. At this time, neither the rendering result in the script layer 217 nor the image currently generated in the script layer 217 is displayed on the display 104. The rendering result is transmitted to the data conversion unit 203 of the native layer 218, and converted into image data in a format usable by the printer 112.

<Processing Associated with User Operation>

Figure 3:
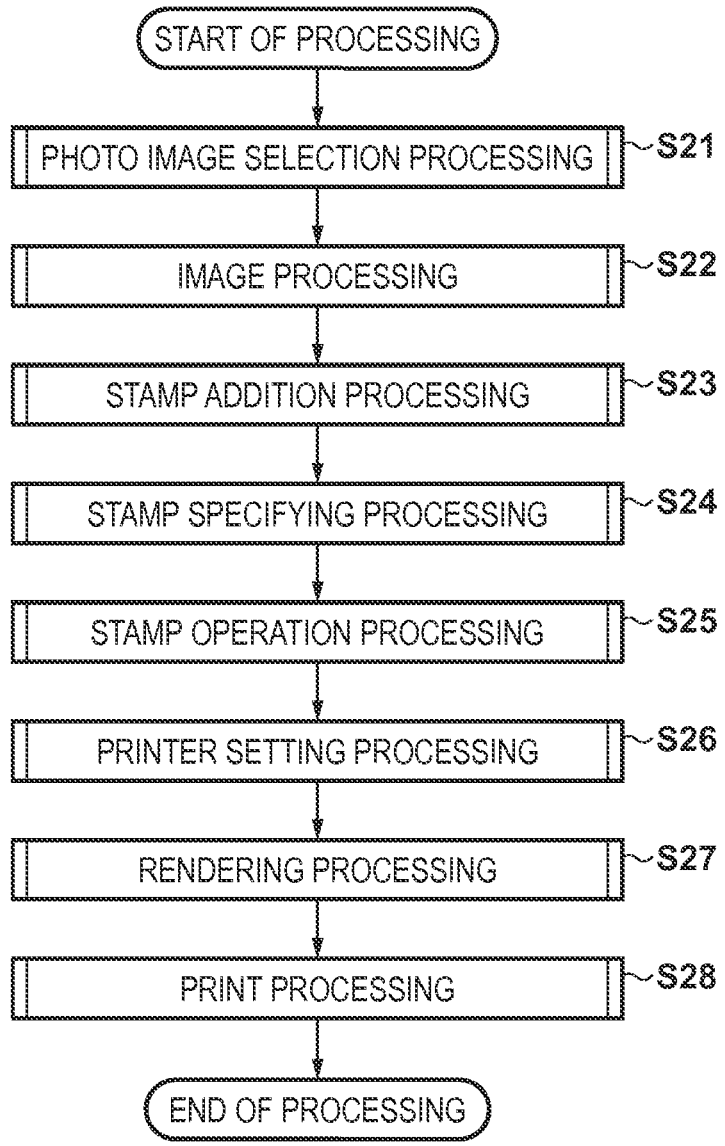
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. Note that the processing in each step of this flowchart is implemented when the CPU 100 of the information processing apparatus 115 performs a program stored in the ROM 101 or secondary storage device 103. Each step shown in FIG. 3 transits according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation, the same shall apply hereinafter) on a photo image selection button 1201 of the application screen 1200, the CPU 100 selects an arbitrary image in accordance with the operation. After the image is selected, the CPU 100 displays the selected image on an entire rendering region 1206 of the application screen 1200.

In step S22, upon detecting a user operation on a slide bar 1202 for adjusting the luminance of the displayed image, the CPU 100 sets a correction parameter to be used for image processing in accordance with the user operation. The CPU 100 performs the image processing for the displayed image according to the set correction parameter, and displays processing contents and a processing result in the rendering region 1206.

In step S23, upon detecting a user operation on a stamp addition button 1203, the CPU 100 displays a stamp list 1207. Upon detecting selection of a stamp by a user operation on the stamp list 1207, the CPU 100 adds/displays the selected stamp in the rendering region 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation on a slide bar 1204 for rotating the stamp in the operation acceptance status, the CPU 100 rotates the stamp in the operation acceptance status as a stamp operation in accordance with the user operation.

In step S26, upon detecting a user operation on a print button 1205, the CPU 100 displays a setting screen 1301 (FIG. 13) for setting information necessary for printing. The information necessary for printing includes, for example, setting items of a paper size, paper type, print quality, bordered/borderless, as shown in the setting screen 1301 of FIG. 13. In addition, settable setting items such as double-sided/single-sided and monochrome/color are provided depending on the functions of the printer to be used.

In this embodiment, upon detecting a user operation on a setting completion button 1302 of the setting screen 1301, a setting screen 1401 (FIG. 14) for setting further information necessary for printing is displayed. The further information necessary for printing includes setting items of a source profile, destination profile, and matching method, as shown in the setting screen 1401 of FIG. 14.

Note that a (color) profile is that in which the color characteristic of a device and the requested specifications of the appearance are described, and is defined by mapping between the input and output color spaces of the device or a "profile connection space (PCS)". Examples of the PCS are CIELAB (L*a*b*) and CIEXYZ. Mapping is represented in a table format. For a value which is not in the table, interpolation may be performed or a series of parameters for conversion may be prepared. Then, when converting an image with a given profile into an image with another profile, the conversion source profile is called a source profile, and the conversion destination profile is called a destination profile.

In step S27, upon detecting a user operation on a setting completion button 1402 of the setting screen 1401, the CPU 100 performs rendering to convert the image displayed in the rendering region into a print resolution for output to the printer.

In step S28, the CPU 100 transmits the image converted into the print resolution to the printer together with a printer control command. With the above processing, the image selected by the user is printed by the printer 112.

Note that the processing shown in FIG. 3 is merely an example. Processing contents are not limited to this, and the processing order of the steps is not limited to this either. In this embodiment, the first program layer including an instruction set to be translated and performed by the processor is defined as the script layer 217, and the second program layer including an instruction set translated in advance by a unit other than the processor is defined as the native layer 218. A program including the first program layer and the second program layer implements a hybrid application. Character string data is defined as the first format and binary data is defined as the second format. Note that the script layer 217 can hold data in the text format, and the native layer 218 can hold data in the binary format.

<Selection of Printer>

First, when an application for implementing the processing shown in FIG. 3 is activated by a user operation, the application performs discovery processing (not shown) of a connectable external device (the printer 112). The discovery processing indicates processing of specifying the IP address of the connectable printer 112 in the network 113 in which the information processing apparatus 115 exists.

The information processing apparatus 115 can transmit an instruction to acquire attribute information of various printers to the IP address (in some cases, a plurality of IP addresses) acquired by the discovery processing, and acquires a reply. The generated command is broadcast to network devices (for example, routers connected by Wi-Fi®) on the network in a format complying with the communication protocol of the printer. The communication method may be a Wi-Fi Direct mode or a mode of using a telephone line. The present invention, however, is not limited to them. As a result of transmitting the command, the native layer 218 receives, from the printer, a response including information about the printer such as a printer name and model name. The model name acquired in the native layer 218 can be transmitted to the script layer 217, thereby displaying a list of printers.

<Details of Photo Image Selection Processing>

Figure 4:
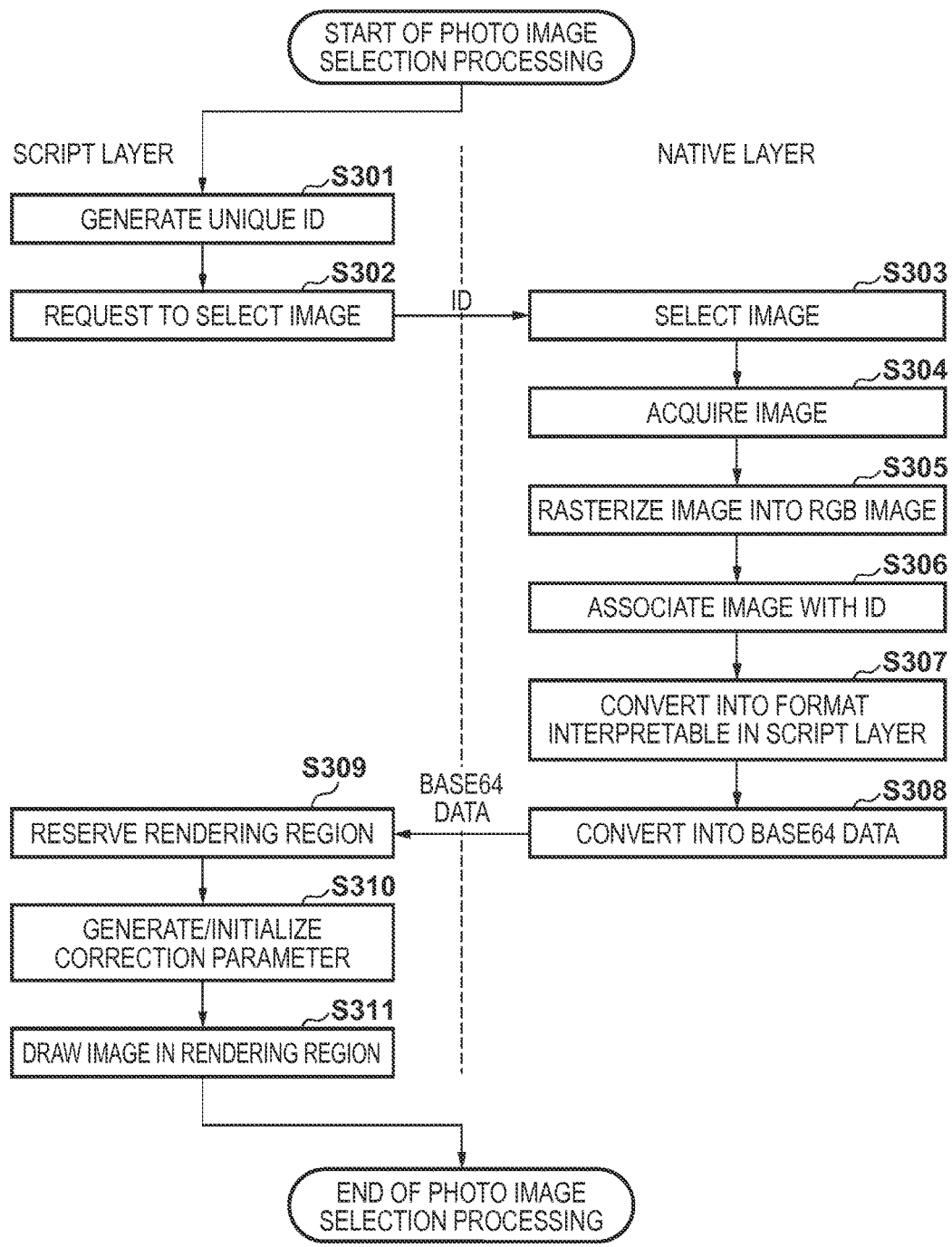
FIG. 4 is a flowchart illustrating details of photo image selection processing.

Details of the photo image selection processing in step S21 of FIG. 3 will be described with reference to FIG. 4. Note that steps S301, S302, and S309 to S311 are processes performed by the CPU 100 using the program of the script layer 217, and steps S303 to S308 are processes performed by the CPU 100 using the program of the native layer 218.

In step S301, the CPU 100 generates a unique ID. This ID may have any form such as a numerical value or character string as long as it can be transmitted from the script layer 217 to the native layer 218. In step S302, the CPU 100 requests the native layer 218 to select an image in accordance with a user operation on the photo image selection button 1201 together with the generated ID. As a request method, the binding function is used to call an image selection API unique to the native layer 218 from the script layer 217. A function capable of being directly called from the script layer 217 or a so-called wrapper of indirectly calling the function is prepared in advance in the native layer 218.

In step S303, the CPU 100 displays a device-specific image selection UI on the display 104. Based on a user operation on the displayed image selection UI, one arbitrary image is selected. In the image selection processing, for example, one image is selected from a folder managed in the information processing apparatus 115. The present invention, however, is not limited to this. For example, an image on the Internet or an image in a detachable storage medium may be selected, or an image shot using the internal image capturing device 110 of the information processing apparatus 115 may be acquired.

In step S304, the CPU 100 acquires the selected image. If, for example, the selected image is in the form of an image file, the CPU 100 opens the image file, and reads out its contents. In step S305, the CPU 100 rasterizes the acquired image into an RGB image. In step S306, the CPU 100 holds the rasterized RGB image and the source profile of the acquired image in the data holding unit 204 in association with the ID acquired from the script layer 217. As an association method, for example, an object having the ID and RGB image is created to make it possible to specify the RGB image by the ID. An association method is not limited to this, and a path as the access destination of the ID and the selected image, a function or class to be performed in accordance with the ID and RGB rasterization, and the like can be used.

In step S307, the CPU 100 converts the rasterized RGB image into data in a format supportable in the script layer 217. In this embodiment, in step S307, the RGB image is converted into data in the JPEG (Joint Photography Expert Group) format. In step S308, the CPU 100 converts the data in the JPEG format into base64 data, and transmits the base64 data to the script layer 217. This is done because the data array of the RGB image cannot be used intact in the script layer 217, and it is thus necessary to convert, in the native layer 218, the data array into a format usable in the script layer 217. Since only a character string can be used in JavaScript®, the base64 format which represents data as a character string is used in this embodiment.

In step S309, the CPU 100 receives the base64 data converted in the native layer 218, and reserves a rendering region for displaying the base64 data in the RAM 102. In this embodiment, as an example of reserving the rendering region, the HTML canvas function is used, and the API of the Context object of a canvas is used to draw an image.

In step S310, the CPU 100 generates and initializes a correction parameter. The correction parameter is an object for holding parameters for deciding contents of the image processing in step S22. An example of the correction parameter held by JavaScript® is:

```
var CorrectionParam = function( ){
    this.brightness = 0;
}
```

This correction parameter represents that a variable "brightness" is provided for brightness correction in a CorrectionParam object and a value of 0 is stored.

In this embodiment, for the sake of simplicity, the correction parameter only for brightness (luminance) correction is used. However, parameters (the intensity of a blur filter, ON/OFF of sepia conversion, and the like) for other correction processes may be added.

In step S311, the CPU 100 designates base64 data as data to be drawn in the rendering region, thereby drawing an image in the rendering region according to the designation. More specifically, the interpreter 214 interprets the script of the base64 data, and displays it as an image in the rendering region. An example of a sample code of reflecting the base64 data on the rendering region is:

```
var base64Data = base64 data from native layer
var canvas = document.createElement("canvas");
//reserve the rendering region of an image
canvas.setAttribute("width", 100);      //set the
size of the rendering region
```

-continued

Figure 12:
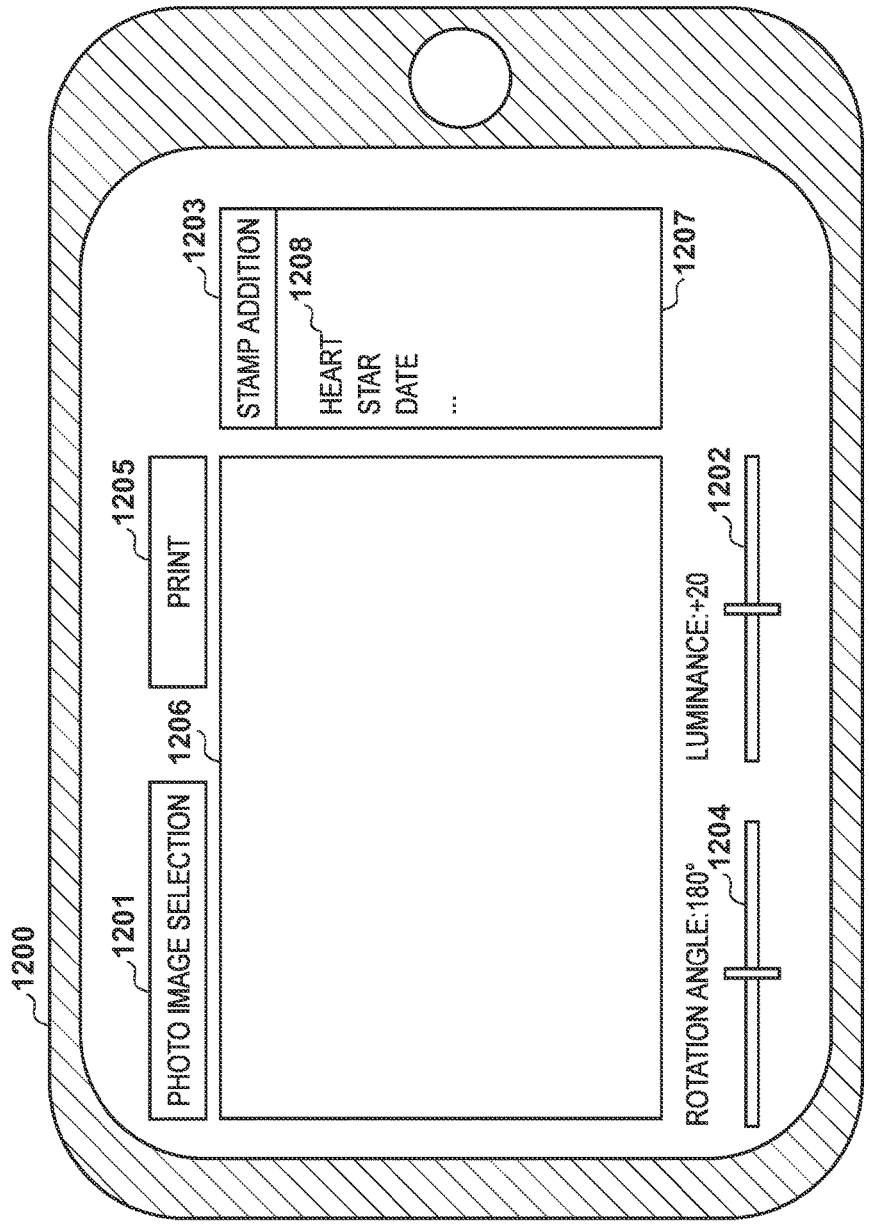
FIG. 12 is a view showing an example of an application screen.

```
canvas.setAttribute("height", 100);
var context = canvas.getContext("2d");    //generate an
object having an API to be drawn in the rendering
region
var img = new Image( );    //generate an Image object
img.src = base64Data;    //set the received base64
data as the URI of the image
img.onload = function( ){    //start processing after the
end of loading of the image
context.drawImage(img, 0, 0, img.width, img.height, 0,
0, canvas.width, canvas.height);    //draw the image in
the rendering region using a method of a context object
document.getElementById("div").appendChild(canvas);
//This flowchart assumes a layer structure of many
canvases.}
These canvases do not freely exist everywhere, and
drawing, moving, and enlargement operations are
performed within a specific region (the rendering
region 1206 of FIG. 12). The region is designated by
"div", and each canvas is added to "div".
```

<Details of Image Processing>

Details of the image processing in step S22 of FIG. 3 will be described with reference to FIG. 5. Note that steps S401 to S403, S409, and S411 are processes performed by the CPU 100 using the program of the script layer 217, and steps S404 to S408 and S410 are processes performed by the CPU 100 using the program of the native layer 218.

In step S401, the CPU 100 sets the correction parameter. In this example, the CPU 100 updates the value of "brightness" of the correction parameter generated in step S310 of FIG. 3 by a value set in accordance with a user operation on the slide bar 1202. In step S402, in the script layer 217, the CPU 100 activates an indicator, and displays it on the display 104. The indicator is displayed to notify the user that the processing is in progress, and is generally represented by a progress bar, a clock mark, or an image such as flickering or rotation of a figure. In step S403, the CPU 100 converts the set correction parameter into a format usable in the native layer 218. In this example, the correction parameter is in the form of an object, and cannot be used intact in the native layer 218. Thus, the CPU 100 converts the set correction parameter into a JSON character string. The CPU 100 transmits the correction parameter converted into the JSON character string to the native layer 218 together with the ID generated in step S301 of FIG. 3.

In step S404, the CPU 100 decodes the correction parameter converted into the JSON character string, thereby acquiring the correction parameter. More specifically, the correction parameter is parsed using a parser included in the OS layer 219. In the above example, after the parsing processing, "brightness" of the correction parameter is acquired.

In step S405, the CPU 100 specifies the RGB image rasterized in step S305 of FIG. 3 based on the ID acquired from the script layer 217. Note that association between the ID and the image is not limited to paring the ID and the RGB image, as described above. For example, a method of associating the path of the image with the ID may be used. There are various examples to be associated with the ID, such as an object of the native layer 218, the first address of image data, and a function of calling the image.

In step S406, the CPU 100 determines, based on the acquired correction parameter, image processing to be performed, and performs the image processing corresponding to the correction parameter for the RGB image specified in step S405. In this embodiment, a value of 10 is added to the R, G, and B values of all pixels according to the brightness correction parameter.

In step S407, the CPU 100 converts the RGB image having undergone the image processing into data in a format supportable in the script layer 217. In this example, the CPU 100 converts the RGB image into data in the JPEG format, similarly to step S307 of FIG. 3. In step S408, the CPU 100 requests the script layer 217 to stop the indicator. This is implemented by calling an indicator stop function defined in the script layer 217 from the native layer 218.

In step S409, the CPU 100 stops the indicator, and removes the indicator displayed on the display 104.

On the other hand, in step S410, the CPU 100 converts the converted data in the JPEG format into base64 data, and transmits the base64 data to the script layer 217.

In step S411, the CPU 100 receives the base64 data converted in the native layer 218, and draws an image in the rendering region reserved in step S309 of FIG. 3 in accordance with the base64 data. When this image is interpreted in the OS layer 219, it is displayed in the designated display region.

<Details of Stamp Addition Processing>

Figure 6:
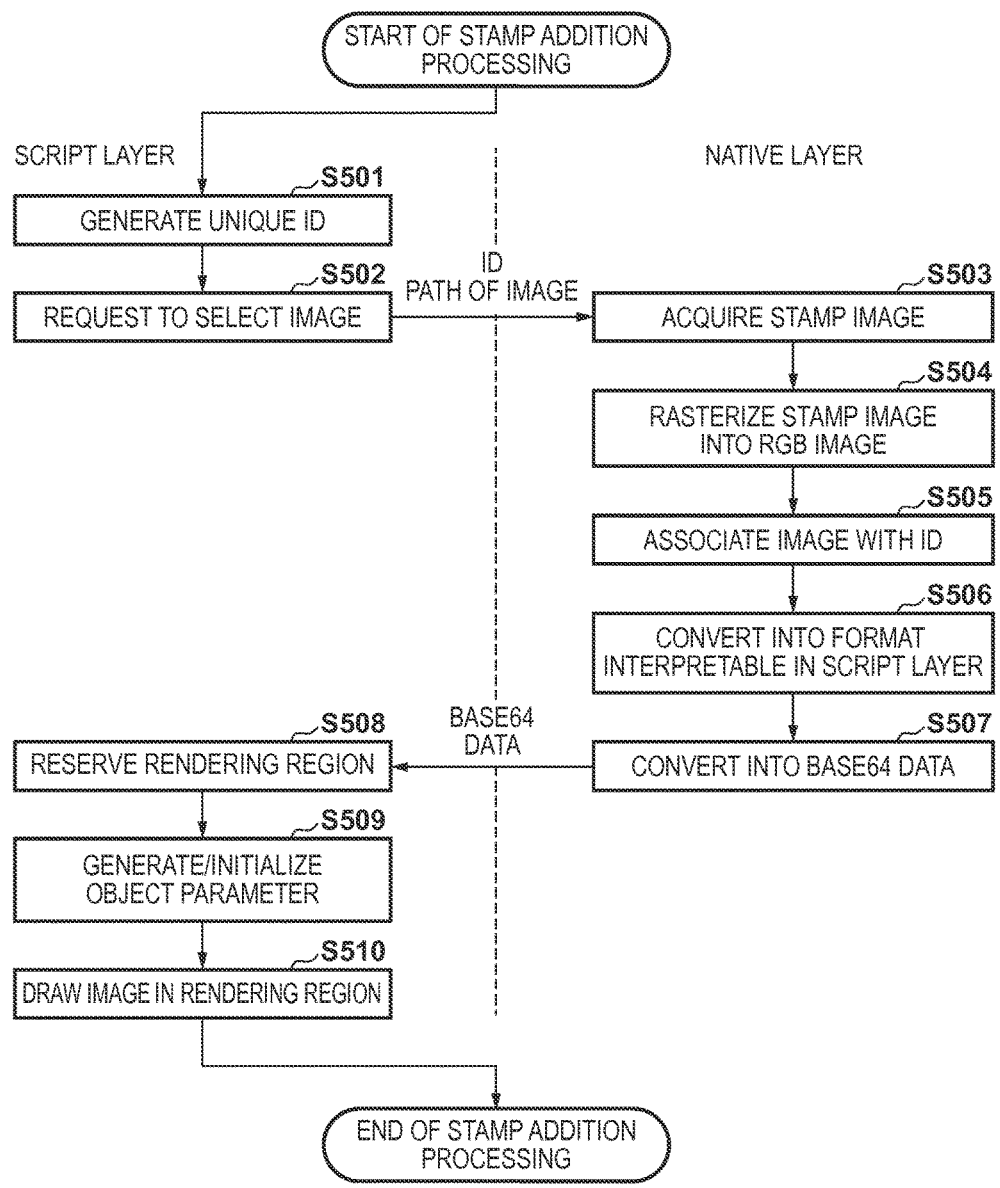
FIG. 6 is a flowchart illustrating details of stamp addition processing.

Details of the stamp addition processing in step S23 of FIG. 3 will be described with reference to FIG. 6. In this example, a case in which a heart stamp 1208 is selected after the stamp addition button 1203 of the application screen 1200 shown in FIG. 12 is pressed by a user operation and the stamp list is displayed will be exemplified. Note that steps S501, S502, and S508 to S510 are processes performed by the CPU 100 using the program of the script layer 217, and steps S503 to S507 are processes performed by the CPU 100 using the program of the native layer 218.

In step S501, the CPU 100 generates a unique ID. This ID has the same characteristic as that of the ID generated in step S301 of FIG. 3. In step S502, the CPU 100 transmits the access destination (absolute path) of an image to be used as a stamp to the native layer 218 together with the ID generated in step S501, thereby requesting to select the stamp image corresponding to the stamp.

In step S503, the CPU 100 acquires the stamp image using the absolute path of the stamp image received from the script layer 217 and a device-specific image selection API. In step S504, the CPU 100 rasterizes the acquired stamp image into an RGB image. In step S505, the CPU 100 holds the rasterized RGB image in the data holding unit 204 in association with the ID acquired from the script layer 217. An association method is the same as that in step S306 of FIG. 3. In step S506, the CPU 100 converts the rasterized RGB image into data in a format supportable in the script layer 217. In this conversion processing, the CPU 100 converts the RGB image into data in the JPEG format, similarly to step S307 of FIG. 3. In step S507, the CPU 100 converts the data in the JPEG format into base64 data, and transmits the base64 data to the script layer 217.

In step S508, the CPU 100 receives the base64 data converted in the native layer 218, and reserves a rendering region for displaying the base64 data in the RAM 102. In step S509, the CPU 100 generates and initializes an object parameter. Note that the object parameter is an object for holding parameters to be used, at the time of the rendering processing in step S27 of FIG. 3, to decide the rotation angle of the stamp after the rendering processing. An example of the object parameter held by JavaScript® is:

```
var ObjectParam = function( ){
    this.theta = 0;
    this.posX = 0;
```

```
    this.posY = 0;
    this.width = 100;
    this.height = 100;
}
```

This object parameter represents that a variable "theta" indicating the rotation angle is provided in an ObjectParam object and a value of 0 is stored in "theta". Similarly, "posX" represents an x-coordinate when the upper left corner of the rendering region is set as a reference point, "posY" represents a y-coordinate when the upper left corner of the rendering region is set as a reference point, "width" represents the lateral width of the rendering region, and "height" represents the longitudinal width of the rendering region. Note that the object parameter is minimized in this embodiment for the sake of simplicity. However, it is apparent that other parameters (translation amount, enlargement magnification, and the like) can be added and used at the time of drawing or rendering.

In step S510, the CPU 100 displays the base64 data as an image in the rendering region 1206 based on the generated object parameter. More specifically, the CPU 100 transmits the base64 data corresponding to the selected stamp to the interpreter 214 of the OS layer 219. The interpreter 214 interprets the script of the base64 data, and displays it as a stamp image in the rendering region. Note that one stamp is selected in this embodiment for the sake of simplicity. However, a plurality of stamps can be selected. In addition, an image prepared in advance is used as a stamp in this embodiment. However, a method of generating, in the script layer, an object to be drawn by using a Context object may be used.

<Details of Stamp Specifying Processing>

Figure 7:
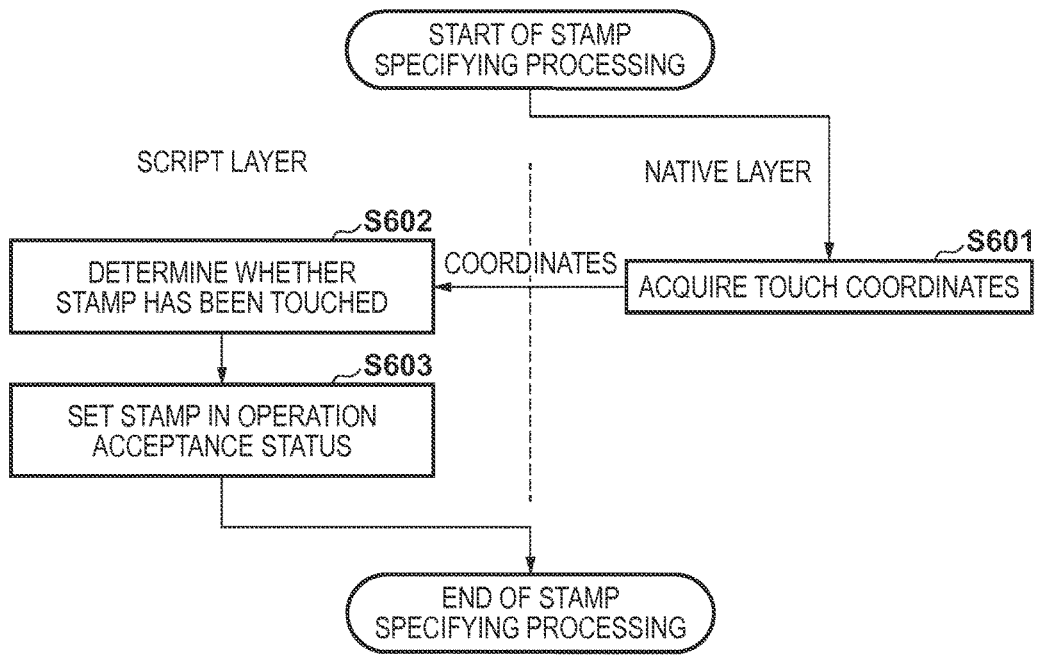
FIG. 7 is a flowchart illustrating details of stamp specifying processing.

Details of the stamp specifying processing in step S24 of FIG. 3 will be described with reference to FIG. 7. Note that steps S602 and S603 are processes performed by the CPU 100 using the program of the script layer 217, and step S601 is a process performed by the CPU 100 using the program of the native layer 218.

In step S601, the CPU 100 acquires coordinates touched on the display 104, and transmits them to the script layer 217.

Figure 5:
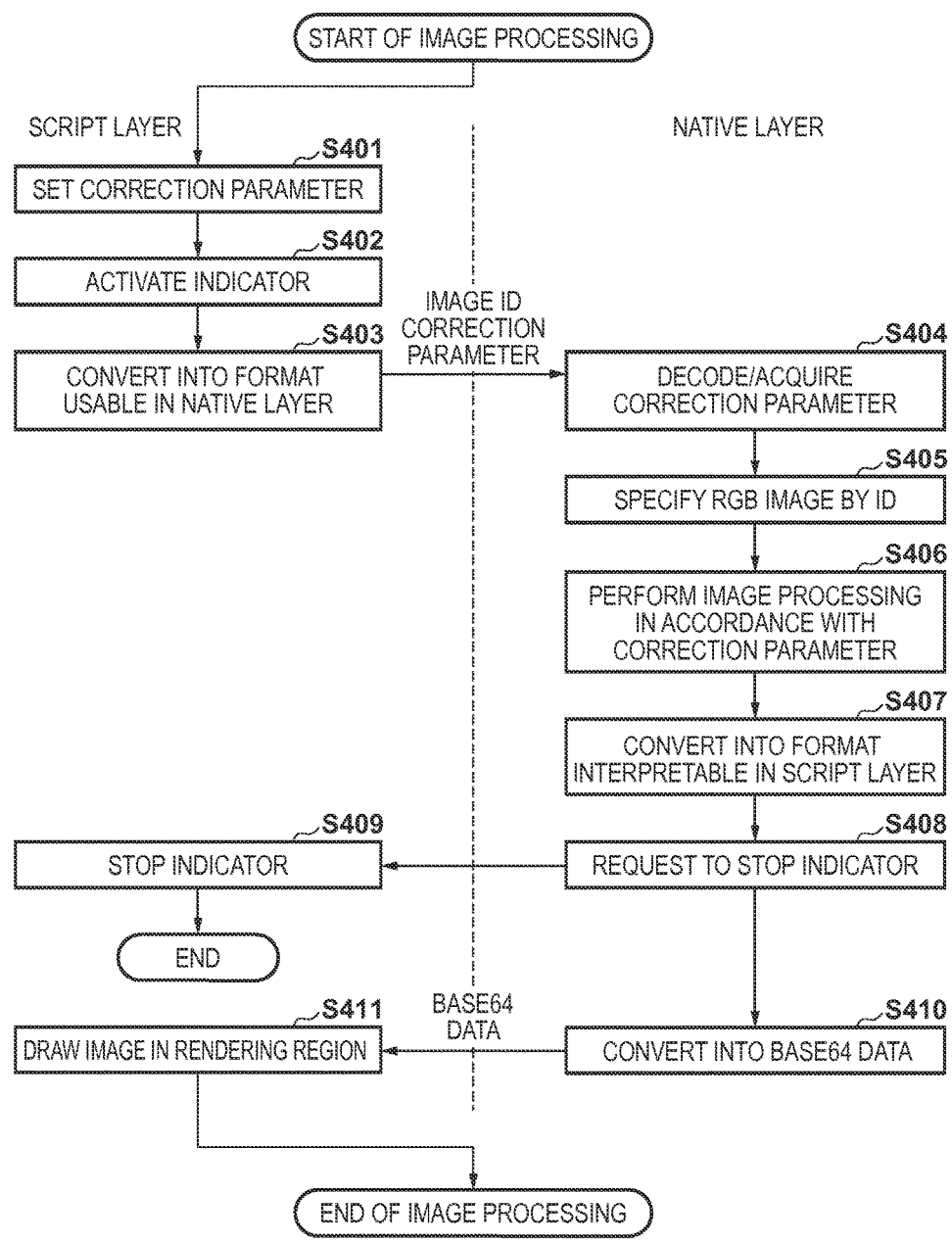
FIG. 5 is a flowchart illustrating details of image processing.

In step S602, the CPU 100 determines whether the stamp added in step S23 of FIG. 3 has been touched, based on the coordinates received from the native layer 218 and information of the object parameter generated in step S509 of FIG. 5. In the added stamp, the object parameter includes the initial values. Therefore, according to the above example of the object parameter, the stamp is drawn in a region of 100 in the x direction and 100 in the y direction with reference to (0, 0) set at the upper left corner of the rendering region 1206. If, therefore, a value obtained by subtracting the x-coordinate of the rendering region 1206 from the x-coordinate of the received coordinates (x, y) falls within the range from 0 to 100, and a value obtained by subtracting the y-coordinate of the rendering region 1206 from the y-coordinate of the received coordinates (x, y) falls within the range from 0 to 100, it can be determined that the stamp has been touched. If it is determined that the stamp has been touched, the stamp is set in the operation acceptance status. The following description will be provided by assuming that the stamp added in step S23 has been touched.

In step S603, the CPU 100 sets the stamp in the operation acceptance status in accordance with the determination result. Setting the stamp in the operation acceptance status is equivalent to temporarily recording the ID of the touched stamp as a stamp ID of interest in the script layer 217. Since images and IDs are stored in pairs in the data holding unit 204, if only an ID is grasped, it is possible to specify a unique image.

<Details of Stamp Operation Processing>

Figure 8:
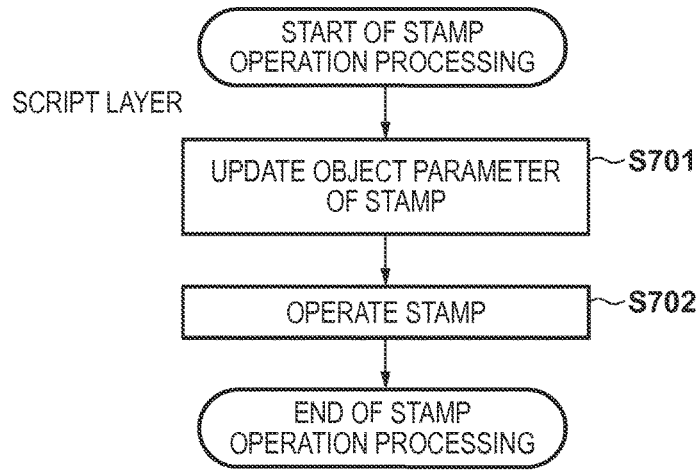
FIG. 8 is a flowchart illustrating details of stamp operation processing.

Details of the stamp operation processing in step S25 of FIG. 3 will be described with reference to FIG. 8. Note that each step of FIG. 8 is a process performed by the CPU 100 using the program of the script layer 217.

In step S701, the CPU 100 updates the value of "rotate" of the object parameter of the stamp. For example, the CPU 100 updates the value by a value set using the slide bar 1204 of FIG. 12. In step S702, the CPU 100 re-draws the stamp set in the operation acceptance status in step S603 of FIG. 7 in the rendering region 1206 by using the object parameter. If, for example, the stamp image is drawn in an HTML canvas, it is possible to rotate the image in the canvas by using the rotate method of the Context object of the canvas.

Note that an operation of the stamp is only rotation in this embodiment. However, other operations such as enlargement/reduction and translation may be possible. It is also apparent that if a photo image has an object parameter, the same operation as the stamp operation is possible.

<Details of Printer Setting Processing>

Details of the printer setting processing in step S26 of FIG. 3 will be described with reference to FIG. 9. Note that steps S801 and S807 to S809 are processes performed by the CPU 100 using the program of the script layer 217, and steps S802 to S806 and S810 are processes performed by the CPU 100 using the program of the native layer 218.

In step S801, in the script layer 217, the CPU 100 requests the native layer 218 to acquire printer information as device information. This is equivalent to a request from the script layer 217 for communicating with the printer 112. As a request method, an API unique to the native layer is called from the script layer by using the binding function, similarly to the image selection processing. A function capable of being directly called from the script layer 217 or a so-called wrapper of indirectly calling the function is prepared in advance in the native layer 218. For example, a native function GetPrinterinfo is prepared, and called from the script side. In this way, the native layer acquires a request to communicate with an external device from the script layer.

In general, it is impossible to directly communicate with an external device from the script layer 217 under the security restrictions. Therefore, as described above, the script layer 217 requests the native layer 218 to acquire external device information, and then communicates with an external device via the native layer 218. The native layer 218 has a function of communicating with an external device (for example, the printer 112) via the OS layer 219.

In step S802, the CPU 100 calls a function for acquiring the printer information in accordance with the request from the script layer 217, and performs detection of a printer, that is, so-called discovery. As an example of a detection method, a printer connected via the same wireless LAN router is detected. In this example, since detection of a communicable printer is performed, the CPU 100 requests a response by a broadcast or multicast method by a protocol such as Bonjour, and stands by for a response from a printer, thereby detecting the printer.

In step S803, the CPU 100 stores an IP address included in the response from the printer 112. In step S804, the CPU 100 transmits a printer information acquisition command as a device information acquisition command to the printer 112 corresponding to the stored IP address. If there are a plurality of printers 112 which have responded, the CPU 100 transmits the printer information acquisition command to each of all the printers 112. The printer information acquisition command is an instruction to designate the operation of the printer, and its example is expressed in XML given by:

```
01:  <?xml version="1.0" encoding="utf-8" ?>
02:  <cmd xmlns:trans="http://www.xxxx/yyyyy/">
03:    <contents>
04:      <operation>GetCapability</operation>
05:    </contents>
06:  </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetCapability" is an instruction of acquiring information of a printer as an external device. For example, it is requested to provide capability information such as a paper type, a size, the presence/absence of a borderless print function, and the print quality supported by the printer.

Note that a printer information acquisition command may be generated by, for example, loading permanent text stored in advance in the ROM 101. Also, the format is not limited to the text format such as XML, and the command may be described in the binary format, and communicated by a protocol complying with the format. The generated printer information acquisition command is transmitted to the printer 112 via the printer communication unit 213 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
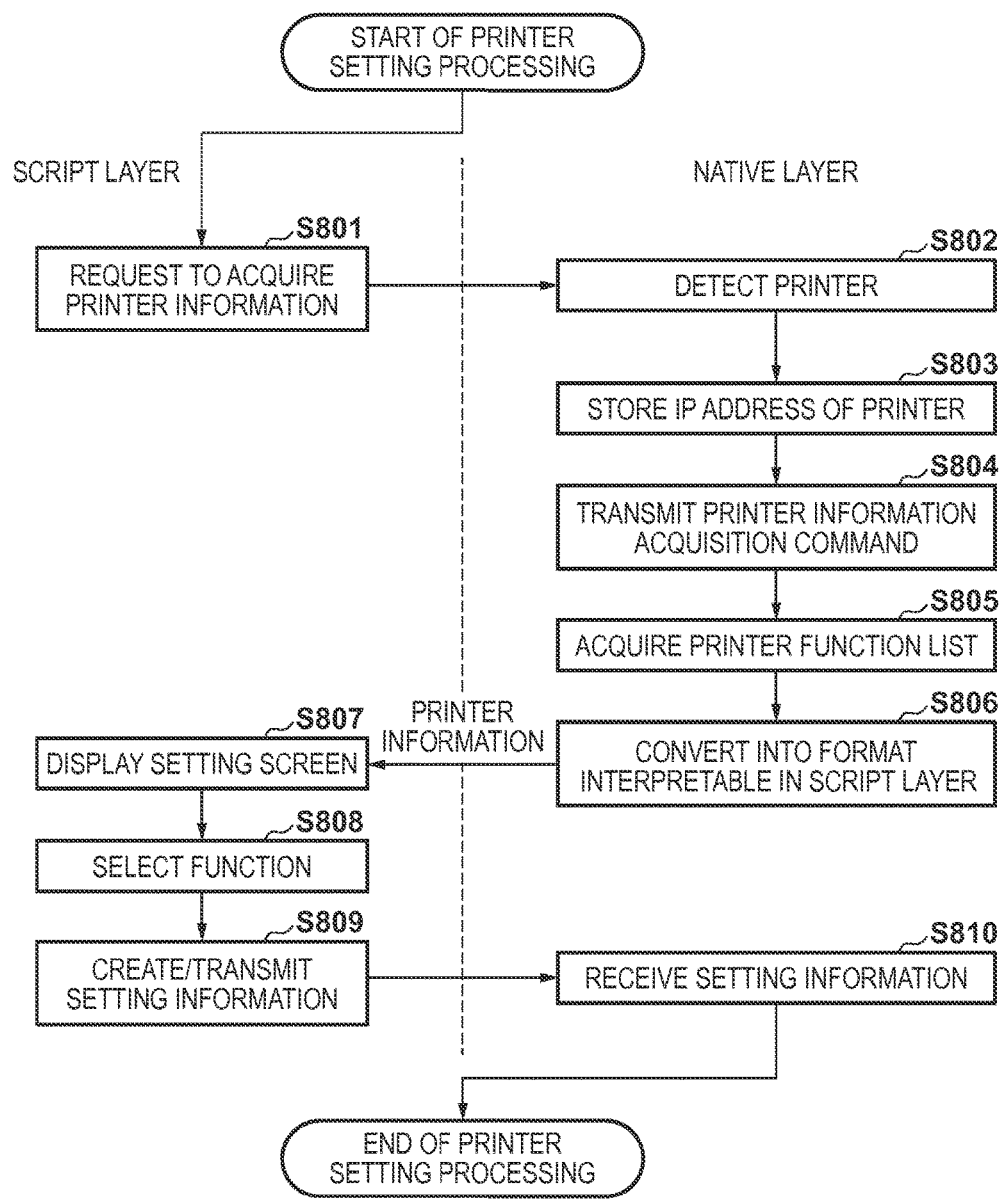
FIG. 9 is a flowchart illustrating details of stamp setting processing.

Referring to FIG. 9, a printer information acquisition command is generated in the native layer 218. However, even if a printer information acquisition command is generated in the script layer 217, it is possible to obtain the same effects. In this case, a printer information acquisition command including the above statement in the XML format is created in the script layer 217, and transferred to the native layer 218. Upon receiving the statement, the native layer 218 transmits the printer information acquisition command to the printer 112 in a format complying with a communication protocol.

Upon receiving the printer information acquisition command from the information processing apparatus 115, the printer 112 transmits the printer information as device information in the XML format to the information processing apparatus 115 according to the communication protocol. An example of the printer information is given by:

```
01:  <?xml version="1.0" encoding="utf-8" ?>
02:  <cmd xmlns:trans="http://www.xxxx/yyyyy/">
03:    <contents>
04:      <device id="Printer001" />
05:      <mode = 1>
06:        <media>GlossyPaper</media>
07:        <size>A4</size>
08:        <quality>1</quality>
09:        <border>no</border>
10:        <src>sRGB.icc</src>
11:        <dst>001GlossyPaper.icc</dst>
12:        <intent>perceptual</intent>
13:      </mode>
14:      <mode = 2>
          ...
        </mode>
        <mode = 3>
          ...
        </mode>
        ...
      </contents>
    </cmd>
```

The first line indicates a header representing that the information is described in the XML format.

On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>.

The fourth line indicates a device ID. In this example, the model name of the printer 112 is "Printer001".

On the fifth line and subsequent lines, the respective modes of the printer 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 10th line and subsequent lines, <src> describes a source profile name, <dst> describes a destination profile name, and <intent> describes a matching method information.

On the 14th line and subsequent lines, information about mode 2 as another mode is described. In this way, the model name of the printer 112 and all the modes supported by the printer are described in the XML data.

Note that a method of describing printer information is not limited to this. The printer information may be described in another format such as a binary format or a text format which is not a tag format.

In step S805, the CPU 100 receives the printer information from the printer 112, and acquires the function list of the printer 112 from the received printer information. For example, the CPU 100 acquires a printer function list including terms of the type and size of printing paper, the print quality, and bordered/borderless and a term count in each of all the modes of the printer 112. Furthermore, the CPU 100 acquires a list of a corresponding source profile, destination profile, and matching method as the printer information according to this embodiment.

In step S806, the CPU 100 converts the received printer information about the acquired printer function list into a format interpretable in the script layer 217, and transmits the converted information to the script layer 217. That is, the information obtained by communication with the printer 112 is transferred to the script layer 217. More specifically, the binding function is used to transmit the printer information about the printer function list from the native layer 218 to the script layer 217. The native function is called from the script layer 217, and the information is transferred as a return value. By setting a mode to be acquired or the like as an argument, the script layer 217 may receive the return value of the mode. As another example, there is a method of transmitting the received printer information in the XML format, or transmitting the printer information by converting it in a text format without any tag. In addition, the information may be transferred by using the above-described JSON character string, or transferred by a character string such as base64 by using the data conversion units 207 and 203.

In step S807, the CPU 100 forms a setting screen (FIG. 13) including functions usable by the printer 112 based on the printer information received from the native layer 218, and displays the setting screen. In this embodiment, this is called display control. In this embodiment, the printer is selected first. However, if there are a plurality of connectable printers, the CPU 100 generates, at this timing, a display screen for displaying printer names and prompting the user to select a printer for printing (display contents are controlled). Note that a printer selection method is not limited to this, and a method of selecting a printer which responds earliest, a method of selecting a printer having more functions, a method of selecting a printer with not so many print jobs, or the like may be used.

As described above, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
  <head>
    <title>print setting</title>
    <script>
      <!-- paper size -->
      var PaperSizeNum = GetPaperSizeNum( );
      var p = document.getElementById("PaperList");
      var i;
      for(i=0; i<PaperSizeNum; i++){
        p.options[i] = new Option(GetPaperSizeT(i),
GetPaperSizeV(i));
      }
      <!-- paper type -->
      var MediaTypeNum = GetMediaTypeNum( );
      var m = document.getElementById("MediaList");
      var j;
      for(j=0; j<MediaTypeNum; j++){
        m.options[i] = new Option(GetMediaTypeT(j),
GetMediaTypeV(j));
      }
      <!-- print quality -->
      var QualityNum = GetQualityNum( );
      var q = document.getElementById("QualityList");
      var k;
      for(k=0; k< QualityNum; k++){
        q.options[i] = new Option(GetQualityT(k),
GetQualityV(k));
      }
      <!-- bordered/borderless -->
      var BorderNum = GetBorderNum( );
      var b = document.getElementById("BorderList");
      var l;
      for(l=0; l<BorderNum; l++){
```

-continued

```
        b.options[i] = new Option(GetBorderT(l),
GetBorderV(l));
      }
      <!-- print function -->
      function printer( ) {
        SetPrint(document.getElementById("PaperList").value,
             document.getElementById("MediaList").value,
             document.getElementById("QualityList").value,
             document.getElementById("BorderList").value);
      }
    </script>
  </head>
  <!-- display unit -->
  <body>
    paper size   <select id="PaperList"></select><br/>
    paper type   <select id="MediaList"></select><br/>
    print quality <select
id="QualityList"></select><br/>
    bordered/borderless <select
id="BorderList"></select><br/>
    <br/>
    <button id="btn1" onclick="printer( )">setting
completion</button>
  </body>
</html>
```

In the above sample, GetPaperSizeNum( ) GetMediaTypeNum( ) GetQualityNum( ) and GetBorderNum( ) are native functions, and each native function has a function of acquiring an item count. For example, paper sizes supported by the printer are A4, A5, B5, and L size, GetPaperSize Num( ) returns 4.

Also, GetPaperSizeT(n), GetMediaTypeT(n), GetQualityT(n), and GetBorderT(n) are native functions, and each function returns the nth character string. For example, the return value of GetPaperSizeT(0) as a function of returning text of the paper size is "A4", and the return value of GetPaperSizeT(1) is "A5". These values are extracted by the native function from the printer information received from the printer.

Furthermore, GetPaperSizeV(n), GetMediaTypeV(n), GetQualityV(n), and GetBorderV(n) are native functions, and each function returns a value corresponding to the value of the argument n. For example, the return value of GetMediaTypeT(0) as a function of returning text of the paper type is "glossy paper" as a word displayed and presented to the user. On the other hand, the return value of GetMediaTypeV(0) is "GlossyPaper" as a word interpretable by the printer. The word is decided by the native function by associating it with the printer information. For example, if the value extracted from the printer information is "GlossyPaper", text to be displayed is decided as "glossy paper". As a decision method, the native function holds in advance a correspondence table between these values, and decides text according to the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set. Furthermore, not only the print function but also information about image processing and analysis processing processable by the printer, the presence/absence of a silent mode, the presence/absence of the use of a memory card, and a status such as the remaining ink amount may be displayed.

Figure 13:
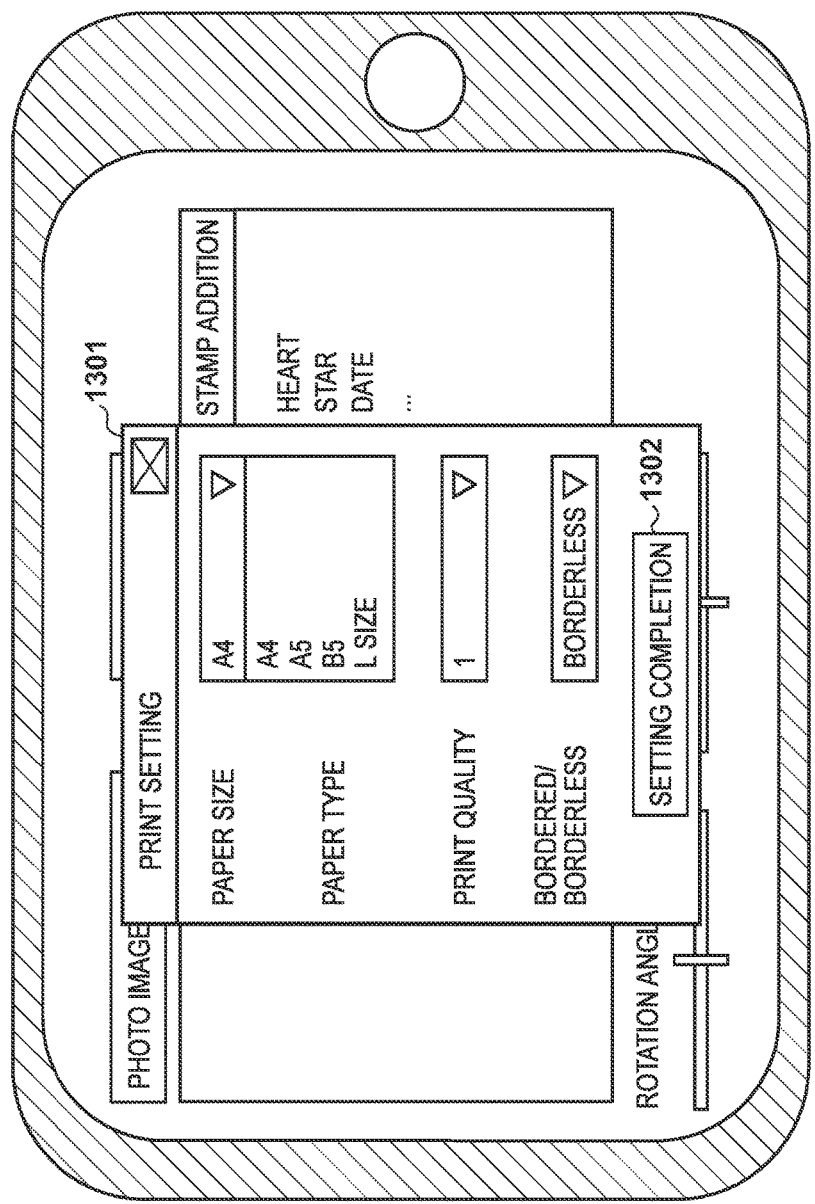
FIG. 13 is a view showing an example of a setting screen.

In step S808, the CPU 100 selects a function to be set in the printer based on a user operation on the setting screen 1301. The setting screen 1301 shown in FIG. 13 is an example in which the HTML description of the above example is rendered using the rendering unit 216, and displayed on the display 104. The printer information is requested via the native layer 218, thereby forming the setting screen 1301 based on the information acquired from the printer information by using the above native function.

Note that the HTML description has been explained to be formed in the script layer 217. However, the present invention is not limited to this. For example, an HTML description may be formed in the native layer 218, rendered in the script layer 217, and displayed on the display 104.

Furthermore, each setting item such as the paper size of the setting screen 1301 is provided as a pull-down menu, and can be selected by a user operation. The setting screen 1301 indicates a state in which a list of selectable items is displayed as a setting item of a paper size by a pull-down menu, and a paper size such as A4 or A5 can be selected by a user operation.

Upon pressing of the setting completion button 1302, a setting screen for color setting which prompts the user to select a source profile, destination profile, and matching method is displayed. As an example of a method of forming a setting screen for color setting, an HTML sample is given by:

```
<!DOCTYPE html>
  <head>
    <title> color setting </title>
    <script>
      <!-- source profile -->
      var SourceProfileNum = GetSourceProfileNum( );
      var p = document.getElementById("SourceProfileList");
      var i;
      for(i=0; i<SourceProfileNum; i++){
          p.options[i] = new Option(GetSourceProfileT(i), GetSourceProfileV(i));
      }
      <!-- destination profile -->
      var DestinationProfileNum = GetDestinationProfileNum( );
      var m = document.getElementById("DestinationProfileList");
      var j;
      for(j=0; j<DestinationProfileNum; j++){
          m.options[i] = new Option(GetDestinationProfileT(j),GetDestinationProfileV(j));
      }
      <!-- matching method -->
      var IntentNum = GetIntentNum( );
      var q = document.getElementById("IntentList");
      var k
      for(k=0; k< IntentNum; k++){
          q.options[i] = new Option(GetIntentT(k), GetIntentV(k));
      }
      <!-- color matching function -->
      function printer( ) {
        SetColor(document.getElementById("SourceProfileList").value,
        document.getElementById("DestinationProfileList").value,
                document.getElementById("IntentList").value);
      }
    </script>
  </head>
  <!-- display unit -->
  <body>
    source profile <select id="SourceProfileList"></select><br/>
    destination profile <select id="DestinationProfileList"></select><br/>
    matching method <select id="IntentList"></select><br/>
    <br/>
```

-continued

```
    <button id="btn1" onclick="printer( )">setting completion</button>
  </body>
</html>
```

In the above sample, GetSourceProfileNum( ) GetDestinationProfileNum( ) and GetIntentNum( ) are native functions, and each native function has a function of obtaining an item count. For example, if there are three source profiles sRGB, AdobeRGB, and ProPhotoRGB supported by the printer, GetSourceProfileNum( ) returns 3.

Also, GetSourceProfileT(n), GetDestinationProfileT(n), and GetIntentT(n) are native functions, and each function returns the nth character string. For example, the return value of GetSourceProfileV(0) as a function of returning text of the source profile is "sRGB", and the return value of GetSourceProfileT(1) is "AdobeRGB". These values are extracted by the native function from the printer information received from the printer.

Furthermore, GetSourceProfileV(n), GetDestinationProfileV(n), and GetIntentV(n) are native functions, and each function returns a value corresponding to the value of the argument n. For example, the return value of GetSourceProfileT(0) as a function of returning text of the source profile is "sRGB" as a word displayed and presented to the user. On the other hand, the return value of GetSourceProfileV(0) is "sRGB.icc" as a word interpretable by the printer. The word is decided by the native function by associating it with the printer information.

Figure 14:
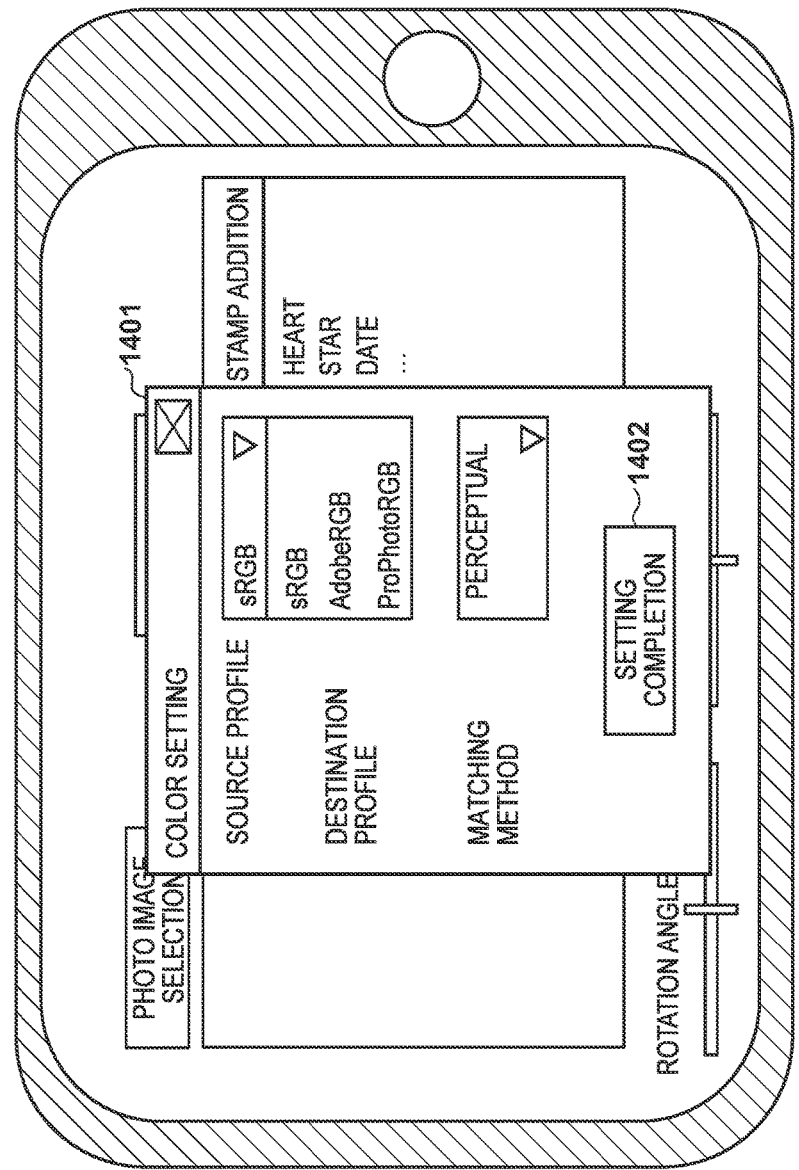
FIG. 14 is a view showing an example of a setting screen.

The setting screen 1401 for color setting shown in FIG. 14 is an example in which the HTML description of the above example is rendered using the rendering unit 216, and displayed on the display 104. The printer information is requested via the native layer 218, thereby forming the setting screen 1401 based on the information acquired using the above native function.

Note that the HTML description has been explained to be formed in the script layer 217. However, the present invention is not limited to this. For example, an HTML description may be formed in the native layer 218, rendered in the script layer 217, and displayed on the display 104.

Furthermore, each setting item such as the source profile of the setting screen 1401 is provided as a pull-down menu, and can be selected by a user operation. The setting screen 1401 indicates a state in which a list of selectable items is displayed as a setting item of a source profile by a pull-down menu, and a color profile such as sRGB or AdobeRGB can be selected by a user operation.

In step S809, upon detecting a user operation on the setting completion button 1402, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer printing settings of a paper size, paper type, print quality, and bordered/borderless as a character string to the native layer 218. Also, SetColor( ) is used to transfer color settings of a source profile, destination profile, and matching method as a character string to the native layer 218.

In step S810, the CPU 100 receives the setting information from the script layer 217 by the binding function. In the native layer 218, a print command is generated based on the received setting information, image data to be printed, and image data of a stamp according to the communication protocol of the printer 112. The printer command is then transmitted to the printer 112 via the printer communication unit 213.

As described above, in response to the request from the script layer 217, the CPU 100 performs communication control to acquire the information from the printer 112 via the native layer 218. This enables the CPU 100 to acquire the performance of the printer 112 and control the UI displayed in the script layer 217.

<Details of Rendering Processing>

Figure 10:
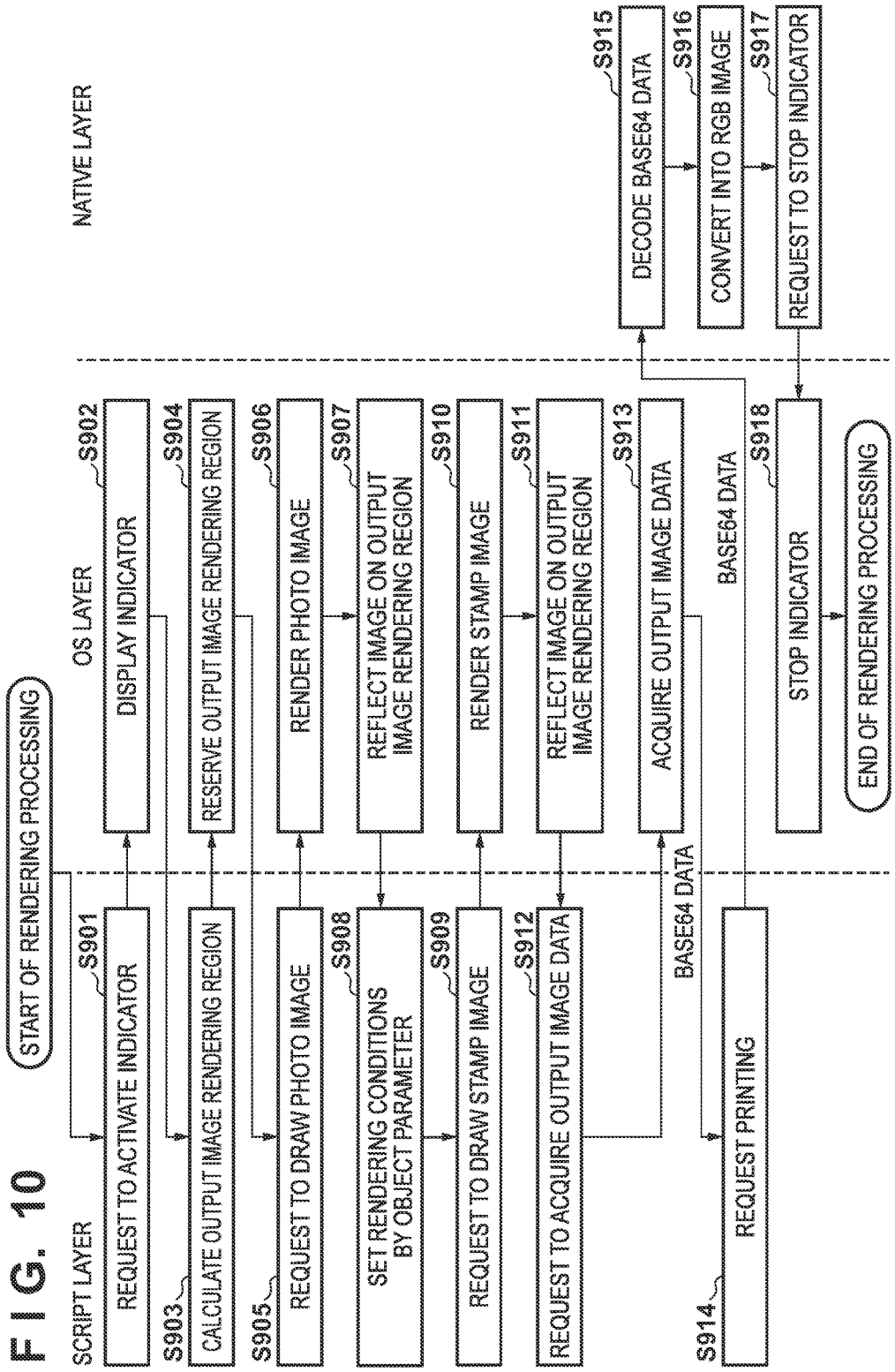
FIG. 10 is a flowchart illustrating details of rendering processing.

Details of the rendering processing in step S27 of FIG. 3 will be described with reference to FIG. 10. Steps S901, S903, S905, S908, S912, and S914 are implemented when the CPU 100 performs the program of the script layer 217. Steps S902, S904, S906, S907, S910, S911, S913, and S918 are implemented when the CPU 100 performs the program of the OS layer 219. Steps S915 to S917 are implemented when the CPU 100 performs the program of the native layer 218.

In step S901, the CPU 100 requests the OS layer 219 to activate an indicator.

In step S902, the CPU 100 displays, on the display 104, the indicator activated by the request.

In step S903, the CPU 100 decides an output size corresponding to the paper size set in the setting information created in step S809, and calculates an output image rendering region.

In step S904, the CPU 100 reserves the calculated output image rendering region in the RAM 102.

In step S905, the CPU 100 requests the OS layer 219 to draw a photo image.

In step S906, the CPU 100 interprets the script of the request to draw the photo image, renders the photo image, and reflects the rendered photo image on the rendering region reserved in step S904 (step S907). The reflecting operation is equivalent to not displaying an image on the display 104 but making a change to the rendering region.

In step S908, the CPU 100 describes and sets, in a script, a change in rendering conditions by an object parameter before requesting to draw a stamp image. In step S909, the CPU 100 requests the OS layer 219 to draw the stamp image.

In step S910, the CPU 100 renders the stamp image under the rendering conditions. That is, rotation processing or resizing of the image is performed in the OS layer. After the end of rendering, the rendered stamp image is reflected, in step S911, on the rendering region reserved in step S904.

In step S912, the CPU 100 requests the OS layer 219 to acquire output image data.

In step S913, the CPU 100 converts the image data existing in the rendering region into base64 data, and transmits the base64 data to the script layer 217.

In step S914, the CPU 100 transmits the base64 data received from the OS layer 219 to the native layer 218, and requests the native layer 218 to print the data.

In step S915, the CPU 100 decodes the base64 data received from the script layer 217. In step S916, the CPU 100 converts the base64 data into an RGB image. In step S917, the CPU 100 requests the OS layer 219 to stop the indicator.

In step S918, the CPU 100 stops the indicator, and removes the indicator displayed on the display 104.

Note that upon receiving the base64 data, the native layer 218 causes, in step S915, the image processing unit 208 to perform color conversion for the rendered image data using color conversion data based on the color settings set in the setting screen 1401. This can generate image data having undergone color conversion appropriate for the color space characteristic of the printer 112 when the printer 112 prints image data corresponding to the image displayed on the display 104.

In this embodiment, the color difference between devices is adjusted via a device-independent color space called the PCS by using a definition file called an ICC profile serving as color conversion data in which the color space characteristic of each device is recorded. Based on the source profile, the RGB space is converted into a device-independent color space such as the CIEL*a*b* space. Based on the destination profile as a conversion destination, the color space is converted into the CIEL'*a'*b'* space. In accordance with the matching method, color space conversion of mapping a mismatch within each color reproduction range is performed. The CIEL'*a'*b'* space is converted into the R'G'B' space indicating image data as a conversion destination.

A color conversion method used in this case is a method using the ICC profile. However, another method may be used. For example, a method using a lookup table of converting data from the RGB space to the R'G'B' space or a method using a matrix operation may be used. In this case, assume that color conversion data corresponding to the color settings is held in the data holding unit 204. If a profile (color conversion data) designated (included) in an image is different from a user-designated profile (color conversion data), similar color conversion is performed after color conversion from the profile of the image to the user-designated profile is performed.

<Details of Print Processing>

Figure 11:
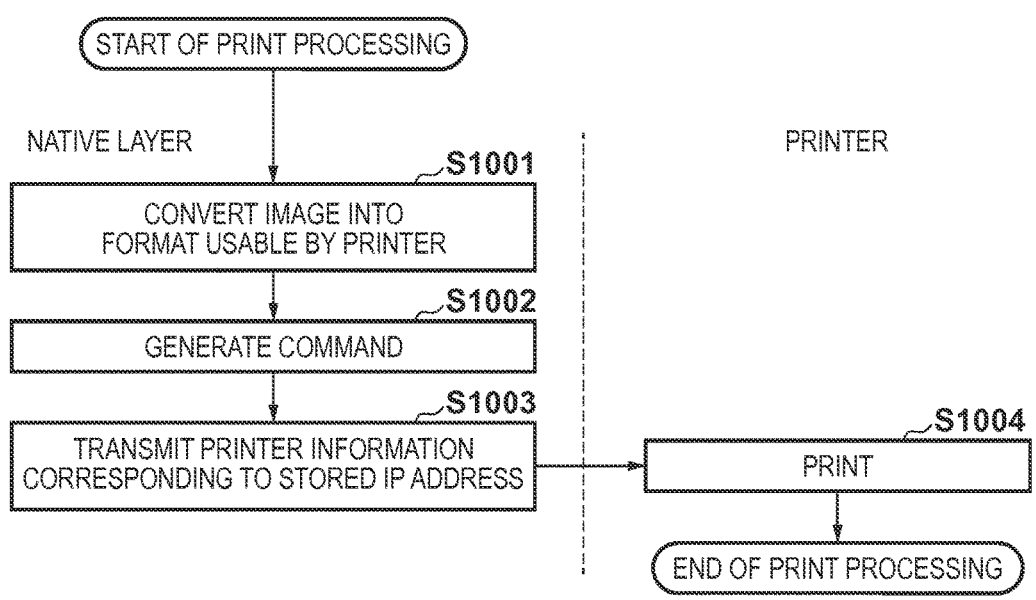
FIG. 11 is a flowchart illustrating details of print processing.

Details of the print processing in step S28 of FIG. 3 will be described with reference to FIG. 11. Note that steps S1001 to S1003 are implemented when the CPU 100 performs the program of the native layer 218.

In step S1001, the CPU 100 converts the RGB image converted in step S916 into a format usable by the printer 112 based on the setting information created in step S809. The format usable by the printer is image data in a printer vender-specific format such as RGB, JPEG, CMYK, or PDF. In step S1002, the CPU 100 uses the conversion result obtained in step S1001 to generate a command to be transmitted to the printer 112. In step S1003, the CPU 100 uses the printer communication unit 213 to transmit the command generated in step S1002 to the printer 112 selected for printing in accordance with the communication protocol usable by the printer.

In step S1004, the printer 112 performs printing according to the command received from the information processing apparatus 115.

As described above, according to this embodiment, in an environment in which a hybrid application is used, even if image data is input/output between devices having different color space characteristics, it is possible to perform color conversion appropriate for the color space characteristic of each device. Also, image data exchange including color conversion can be implemented between the script layer and the native layer. Many OSs normally include a function capable of interpreting JavaScript. This can provide an application to the users of many OSs by developing it once without considering a difference in native language. In addition, it is possible to use the native layer advantageous in terms of the performing speed, thereby improving the usability. Also, the native layer can be implemented without communicating with an external server, thereby allowing an offline operation.

<Second Embodiment>

In the first embodiment, the arrangement of performing color conversion to print an image by the printer 112 has been explained. The present invention is also applicable to a case in which color conversion is performed to display an image on the display 104. This is effective when image data input from an external device having a color space characteristic different from that of the display 104 is output from (displayed on) the display 104.

The second embodiment is different from the first embodiment especially in details of image processing in step S22 of the processing shown in FIG. 3 of the first embodiment, that is, the processing in step S406 of the processing shown in the flowchart of FIG. 5.

In the second embodiment, in step S406, in a native layer 218, a CPU 100 determines, based on an acquired correction parameter, image processing to be performed, and performs the image processing corresponding to the correction parameter for an RGB image. At this time, color conversion is performed by referring to a monitor profile saved in advance for a display 104 as a destination profile. A color conversion method used at this time is the same as that described in step S915 of FIG. 10 in the first embodiment and a detailed description thereof will be omitted. Note that in the second embodiment, the image data having undergone the image processing is converted into base64 data in step S410, and transmitted to a script layer. As a result, in a script layer 217, it is possible to display the image data on which the result of the image processing of the native layer 218 has been reflected.

Figure 15:
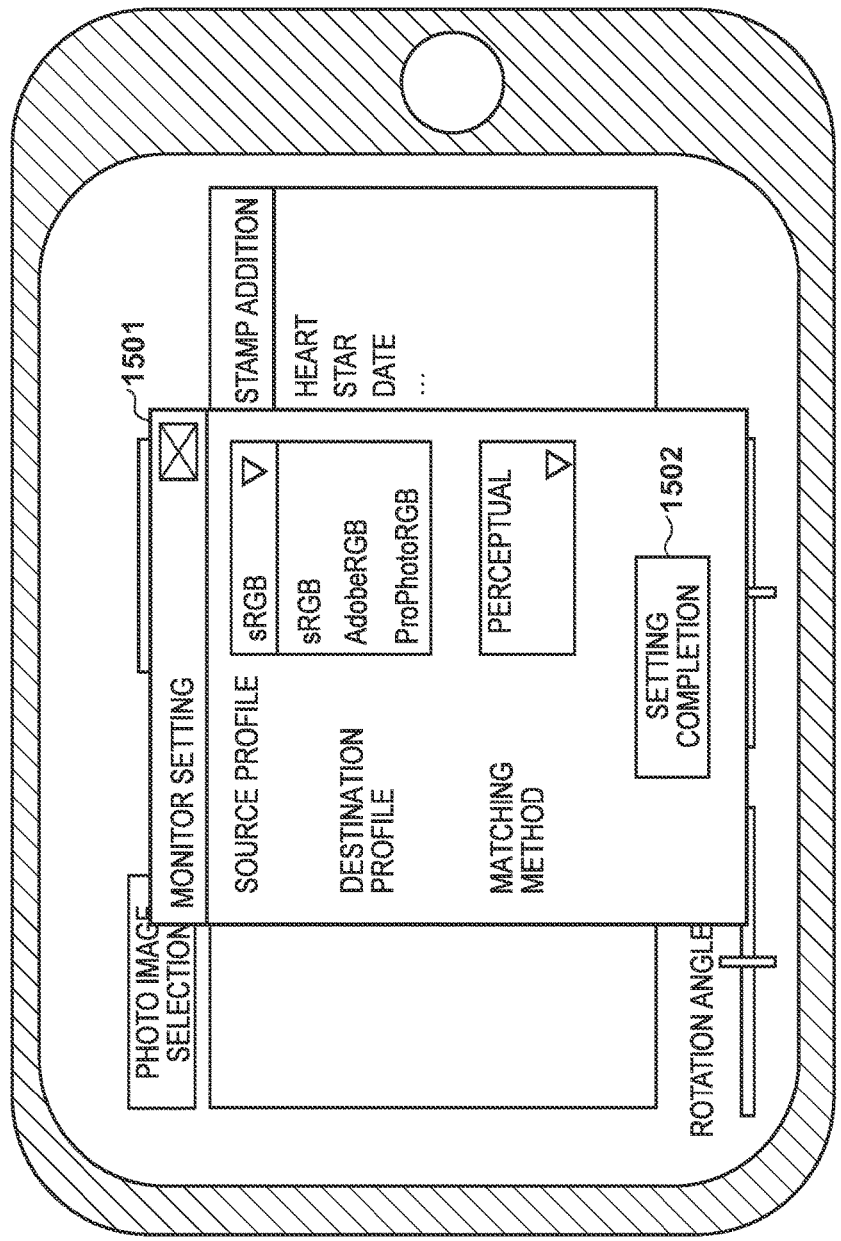
FIG. 15 is a view showing an example of a setting screen.

Furthermore, in the script layer 217, it is possible to display a setting screen for monitor setting, and prompt the user to select a desired profile. A setting screen 1501 for monitor setting shown in FIG. 15 is an example in which an HTML description is rendered using a rendering unit 216 and displayed on the display 104, similarly to the HTML description shown in the example of the first embodiment. By providing the setting screen 1501 including a setting completion button 1502 in the script layer 217, the setting screen 1501 for color setting is formed via the native layer 218 based on information acquired using a native function. At this time, color conversion is performed by referring to a selected monitor profile as a destination profile. As an example of a method of forming the setting screen 1501, an HTML sample is given by:

```
<!DOCTYPE html>
    <head>
    <title>monitor setting</title>
    <script>
        <!-- source profile -->
        var SourceProfileNum = GetSourceProfileNum( );
        var p =
document.getElementById("SourceProfileList");
        var i;
        for(i=0; i<SourceProfileNum; i++){
            p.options[i] = new Option(GetSourceProfileT(i),
GetSourceProfileV(i));
        }
        <!-- destination profile -->
        var DestinationProfileNum =
GetDestinationProfileNum( );
        var m =
document.getElementById("DestinationProfileList");
        var j;
        for(j=0; j<DestinationProfileNum; j++){
            m.options[i] = new
Option(GetDestinationProfileT(j),GetDestinationProfileV
(j));
```

```
        }
        <!-- matching method -->
        var IntentNum = GetIntentNum( );
        var q = document.getElementById("IntentList");
        var k
        for(k=0; k< IntentNum; k++){
            q.options[i] = new Option(GetIntentT(k),
GetIntentV(k));
        }
        <!-- color matching function -->
        function printer( ) {
SetColor(document.getElementById("SourceProfileList").value,
document.getElementById("DestinationProfileList").value,
            document.getElementById("IntentList
").value);
        }
    </script>
    </head>
        <!-- display unit -->
        <body>
        source profile <select
id="SourceProfileList"></select><br/>
        destination profile <select
id="DestinationProfileList"></select><br/>
        matching method <select
id="IntentList"></select><br/>
        <br/>
        <button id="btn1" onclick="monitor ( )">setting
completion</button>
        </body>
</html>
```

As described above, according to the second embodiment, it is possible to obtain the same effects as in the first embodiment even in color conversion for the display.

<Third Embodiment>

In each of the aforementioned embodiments, a device to undergo color conversion is a printer or display. The present invention, however, is not limited to this. For example, the present invention is applicable to case in which image data is input/output between devices (input device and output device) such as a projector, scanner, and camera having different color space characteristics.

In each of the aforementioned embodiments, when outputting image data to be processed (when printing image data by the printer 112 or displaying image data on the display 104), color conversion appropriate for the color space characteristic of an output destination device is performed. The present invention, however, is not limited to this.

For example, color conversion according to each of the aforementioned embodiments may be performed when displaying, on a display 104, a preview of an image to be printed by the printer 112 using image data before outputting the image data to a printer 112.

Also, color conversion according to each of the aforementioned embodiments may be performed when inputting image data to be processed from a scanner and displaying the image data (or image data input by a pre-scan) on the display 104.

Furthermore, color conversion according to each of the aforementioned embodiments may be performed when copying an image by combining a scanner and printer or by using a multi-function peripheral having the scanner function and printer function. In this case, for example, color conversion can be performed at the time of previewing image data input by the scanner function and/or at the time of previewing image data before printing by the printer function. If no preview operation intervenes, only color conversion for a final output destination device can be performed.

In each of the aforementioned embodiments, a case in which color conversion data is held in advance in the data holding unit 204 of the native layer 218 has been explained. The present invention, however, is not limited to this. For example, color conversion data may be saved in the printer 112 or a server 114 shown in FIG. 1. In this case, it is possible to acquire color conversion data using the standard communication function of the Internet via a data saving unit 220 of a native layer 218 upon activation of an application or to include in advance color conversion data in the OS. Furthermore, if there are a plurality of acquisition destinations of color conversion data, priority levels can be assigned to the color conversion data and only color conversion data with a high priority level can be used, or color conversion can be performed, as needed, using each color conversion data.

In each of the aforementioned embodiments, a case in which a hybrid application is operated on a portable information terminal as the information processing apparatus 115 has been exemplified. The present invention, however, is not limited to this. For example, as an environment in which the hybrid application operates, in addition to information terminals represented by a smartphone and table PC, other electronic apparatuses such as a PC, server, game machine, and digital camera are possible.

In addition, in each of the aforementioned embodiments, the printer has been exemplified as an external device. The present invention, however, is not limited to this. For example, another electronic apparatus capable of providing information about itself, such as another smartphone, tablet PC, PC, server, game machine, or scanner, may be used as an external device. For example, it is possible to acquire, from the script layer, information about the electronic apparatus such as the function of the electronic apparatus like the battery level, communication status, wireless LAN connection presence/absence, GPS, temperature, humidity, and acceleration of another portable information terminal.

Examples of an external device are an electric appliance and car. For example, it is possible to acquire information of an electronic apparatus such as an external refrigerator, washing machine, air conditioner, lighting, vacuum cleaner, or thermo pot from the script layer on the portable information terminal, and adjust ON/OFF and output of the function of the electronic apparatus.

Furthermore, in each of the aforementioned embodiments, as a method of drawing a content (a photo image or stamp image), the canvas function of JavaScript has been exemplified. A method of drawing a content is not limited to this. For example, it is possible to draw a content using SVG (Scalable Vector Graphics).

In addition, as the printer according to each of the aforementioned embodiments, an inkjet printer, a laser printer, a dye-sublimation printer, a dot impact printer, or the like can be used. These printers may be so-called multi-function peripherals having not a single function but the printer function, the scanner function, and the like.

Note that the functions of the above embodiments can also be implemented by the following arrangement. That is, the functions of the embodiments are also implemented when program codes for performing the processes of the embodiments are supplied to a system or apparatus, and the computer (or the CPU or MPU) of the system or apparatus performs the program codes. In this case, the program codes read out from a storage medium implement the functions of the above-described embodiments, and the storage medium storing the program codes also implement the functions of the embodiments.

Furthermore, the program codes for implementing the functions of the embodiments may be performed by a single computer (CPU or MPU) or a plurality of computers in cooperation. Also, a computer may perform the program codes or hardware such as a circuit for implementing the functions of the program codes may be provided. Alternatively, some of the program codes may be implemented by hardware and the remaining program codes may be performed by the computer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135176, filed Jun. 30, 2014, which is hereby incorporated by reference herein in its entirety.

What is claimed is:

1. An information processing apparatus for performing, by a processor of the information processing apparatus, a program including (1) a first program layer in which an instruction set is described in a first description language and (2) a second program layer in which an instruction set is described in a second description language different from the first description language, wherein the processor, in performing the second program layer, functions as units comprising:

(a) an image processing unit configured to perform image processing including color conversion for image data to be processed, the image data being designated in the first program layer;

(b) a conversion unit configured to perform conversion processing in which the image data to which the image processing has been performed is converted into image data in a format usable in the first program layer; and (c) a transmitting unit configured to perform transmitting processing to transmit, to the first program layer, the converted image data in the format usable in the first program layer, wherein the second program layer includes the image processing unit, the conversion unit, and the transmitting unit, and wherein before transmitting a command to a printer, the command being based on the image data in the format usable in the first program layer, the image processing unit performs the image processing, the conversion unit performs the conversion processing, and the transmitting unit performs the transmitting processing.

2. The information processing apparatus according to claim 1, wherein the instruction set of the first program layer is translated by the processor and the instruction set of the second program layer is translated in advance by a unit other than the processor.

3. The information processing apparatus according to claim 1, wherein the processor, in performing the second program layer, further functions as a holding unit configured to hold color conversion data corresponding to an output destination device for color conversion of the image data, and wherein the image processing unit performs color conversion of the image data based on the color conversion data.

4. The information processing apparatus according to claim 1, wherein the processor, in performing the second program layer, further functions as a saving unit configured to acquire and save color conversion data corresponding to an output destination device for color conversion of the image data, and wherein the image processing unit performs color conversion of the image data based on the color conversion data.

5. The information processing apparatus according to claim 1, wherein the processor, in performing the first program layer, further functions as a selection unit configured to select color conversion data corresponding to an output destination device, and wherein the image processing unit performs color conversion of the image data based on the color conversion data selected by the selection unit.

6. The information processing apparatus according to claim 1, wherein the image processing unit performs color conversion of the image data based on color conversion data included in the image data.

7. The information processing apparatus according to claim 1, wherein the image processing unit performs color conversion of the image data based on color conversion data that is included in an operating system of the information processing apparatus and that corresponds to an output destination device.

8. The information processing apparatus according to claim 1, wherein the image processing unit performs color conversion of the image data based on color conversion data that is held in an external device connected to the information processing apparatus and that corresponds to an output destination device.

9. The information processing apparatus according to claim 1, wherein (1) the converted image data is transmitted to the first program layer, in a case where the image data is displayed, and (2) the image data to which the image processing has been performed is converted into the command, and then the command is transmitted to the printer, in a case where the image data is printed.

10. A control method for an information processing apparatus for performing, by a processor of the information processing apparatus, a program including (1) a first program layer in which an instruction set is described in a first description language and (2) a second program layer in which an instruction set is described in a second description language different from the first description language, the control method comprising:

performing image processing including color conversion for image data to be processed, the image data being designated in the first program layer;

performing conversion processing in which the image data to which the image processing has been performed is converted into image data in a format usable in the first program layer; and performing transmitting processing to transmit, to the first program layer, the converted image data in the format usable in the first program layer, wherein the image processing, the conversion processing, and the transmitting processing are performed in the second program layer, and wherein before a command is transmitted to a printer, the command being based on the image data in the format usable in the first program layer, the image processing is performed, the conversion processing is performed, and the transmitting processing is performed.

11. The control method according to claim 10, wherein the instruction set of the first program layer is translated by the processor and the instruction set of the second program layer is translated in advance by a unit other than the processor.

12. The control method according to claim 10, wherein color conversion data corresponding to an output destination device for color conversion of the image data is held in the second program layer, and wherein color conversion of the image data is performed based on the color conversion data.

13. The control method according to claim 10, wherein color conversion data corresponding to an output destination device for color conversion of the image data is acquired and saved in the second program layer, and wherein color conversion of the image data is performed based on the color conversion data.

14. The control method according to claim 10, wherein color conversion data corresponding to an output destination device is selected in the first program layer, and wherein color conversion of the image data is performed based on the selected color conversion data.

15. The control method according to claim 10, wherein color conversion of the image data is performed based on color conversion data included in the image data.

16. The control method according to claim 10, wherein color conversion of the image data is performed based on color conversion data that is included in an operating system of the information processing apparatus and that corresponds to an output destination device.

17. The control method according to claim 10, wherein color conversion of the image data is performed based on color conversion data that is held in an external device connected to the information processing apparatus and that corresponds to an output destination device.

18. The control method according to claim 10, wherein (1) the converted image data is transmitted to the first program layer, in a case where the image data is displayed, and (2) the image data to which the image processing has been performed is converted into the command, and then the command is transmitted to the printer, in a case where the image data is printed.

19. A non-transitory computer readable storage medium storing a computer program for causing a computer to, by performing, by a processor of the computer, a program including (1) a first program layer in which an instruction set is described in a first description language and (2) a second program layer in which an instruction set is described in a second description language different from the first description language, function as units comprising:
(a) an image processing unit configured to perform image processing including color conversion for image data to be processed, the image data being designated in the first program layer;
(b) a conversion unit configured to convert the image data to which the image processing has been performed into image data in a format usable in the first program layer; and
(c) a transmitting unit configured to perform transmitting processing to transmit, to the first program layer, the converted image data in the format usable in the first program layer,
wherein the second program layer includes the image processing unit, the conversion unit, and the transmitting unit, and
wherein before transmitting a command to a printer, the command being based on the image data in the format usable in the first program layer, the image processing unit performs the image processing, the conversion unit performs the conversion processing, and the transmitting unit performs the transmitting processing.

20. A control method for an information processing apparatus for performing, by a processor of the information processing apparatus, a program including (1) a first program layer which includes an instruction set to be translated and performed by the processor and (2) a second program layer which includes an instruction set not translated by the processor, the control method comprising:
performing image processing including color conversion for image data to be processed, the image data being designated in the first program layer;
performing conversion processing in which the image data to which the image processing has been performed is converted into image data in a format usable in the first program layer; and
performing transmitting processing to transmit, to the first program layer, the converted image data in the format usable in the first program layer,
wherein the image processing, the conversion processing, and the transmitting processing are performed in the second program layer, and
wherein before a command is transmitted to a printer, the command being based on the image data in the format usable in the first program layer, the image processing is performed, the conversion processing is performed, and the transmitting processing is performed.

21. The control method according to claim 20, wherein the instruction set included in the second program layer is translated in advance by a unit other than the processor.

22. The control method according to claim 20, wherein color conversion data corresponding to an output destination device for color conversion of the image data is held in the second program layer, and
wherein color conversion of the image data is performed based on the color conversion data.

23. The control method according to claim 20, wherein color conversion data corresponding to an output destination device for color conversion of the image data is acquired and saved in the second program layer, and
wherein color conversion of the image data is performed based on the color conversion data.

24. The control method according to claim 20, wherein color conversion data corresponding to an output destination device is selected in the first program layer, and
wherein color conversion of the image data is performed based on the selected color conversion data.

25. The control method according to claim 20, wherein color conversion of the image data is performed based on color conversion data included in the image data.

26. The control method according to claim 20, wherein color conversion of the image data is performed based on color conversion data that is included in an operating system of the information processing apparatus and that corresponds to an output destination device.

27. The control method according to claim 20, wherein color conversion of the image data is performed based on color conversion data that is held in an external device connected to the information processing apparatus and that corresponds to an output destination device.

28. The control method according to claim 20, wherein (1) the converted image data is transmitted to the first program layer, in a case where the image data is displayed, and (2) the image data to which the image processing has been performed is converted into the command, and then the command is transmitted to the printer, in a case where the image data is printed.

* * * * *